United States Patent
Kitchener

(10) Patent No.: US 9,643,121 B2
(45) Date of Patent: May 9, 2017

(54) ROTARY ADSORBENT DRYERS FOR COMPRESSED GAS

(71) Applicant: AKGK PTY LTD, Spotswood Victoria (AU)

(72) Inventor: Anthony John Kitchener, Spotswood Victoria (AU)

(73) Assignee: AKGK PTY LTD, Spotswood Victoria (AU)

( * ) Notice: Subject to any disclaimer, the term of this patent is extended or adjusted under 35 U.S.C. 154(b) by 0 days.

(21) Appl. No.: 15/167,095

(22) Filed: May 27, 2016

(65) Prior Publication Data

US 2017/0036160 A1    Feb. 9, 2017

(30) Foreign Application Priority Data

Aug. 7, 2015  (AU) ................................ 2015903169

(51) Int. Cl.
*B01D 53/06*  (2006.01)
*B01D 53/26*  (2006.01)
*F24F 3/14*   (2006.01)

(52) U.S. Cl.
CPC ........... *B01D 53/06* (2013.01); *B01D 53/261* (2013.01); *F24F 3/1423* (2013.01); *B01D 2257/80* (2013.01)

(58) Field of Classification Search
CPC .. B01D 53/06; B01D 53/261; B01D 2257/80; F24F 3/1423
USPC .......... 95/113, 117; 96/146; 34/472, 473, 80
See application file for complete search history.

(56) References Cited

U.S. PATENT DOCUMENTS

| 1,912,784 | A | * | 6/1933 | Miller ................... B01D 53/18 165/7 |
| 2,926,502 | A | | 3/1960 | Munters et al. |
| 2,993,563 | A | | 7/1961 | Munters et al. |
| 3,855,719 | A | | 12/1974 | Jonsson |
| 4,589,892 | A | * | 5/1986 | Leonard ............... B01D 53/261 96/115 |
| 5,242,473 | A | * | 9/1993 | Ogasahara ............. B01D 53/06 96/125 |
| 5,385,603 | A | * | 1/1995 | Sienack .................. F04B 39/16 96/125 |
| 6,004,384 | A | * | 12/1999 | Caudle ................. B01D 53/261 55/502 |
| 6,447,583 | B1 | * | 9/2002 | Thelen ................... B01D 53/06 95/113 |

(Continued)

OTHER PUBLICATIONS

International Search Report and Written Opinion of the International Searching Authority for International Patent Application No. PCT/AU2016/050429, dated Aug. 19, 2016, 15 pages.

*Primary Examiner* — Frank Lawrence
(74) *Attorney, Agent, or Firm* — Alston & Bird LLP

(57) ABSTRACT

A rotary adsorbent dryer is provided which includes a stationary outer housing having spaced stationary end walls, and a rotor mounted for rotation within the outer housing. A plurality of compressed gas passages pass through the end walls to provide compressed gas flow to or from a respective substantially open end of the rotor. A drive arrangement is provided which is cooperable with an outer circumferential region of the rotor so that it is not necessary to provide a drive shaft which extends axially through desiccant material within the rotor.

23 Claims, 18 Drawing Sheets

(56) References Cited

U.S. PATENT DOCUMENTS

| | | |
|---|---|---|
| 7,166,149 B2 | 1/2007 | Dunne et al. |
| 7,789,942 B2 | 9/2010 | Vanderstraeten et al. |
| 8,349,054 B2 | 1/2013 | Fredenhagen et al. |
| 2003/0188542 A1 | 10/2003 | Vertriest |
| 2005/0132881 A1* | 6/2005 | Baksh ................ B01D 53/0446 95/96 |
| 2011/0132191 A1 | 6/2011 | Fredenhagen et al. |

* cited by examiner

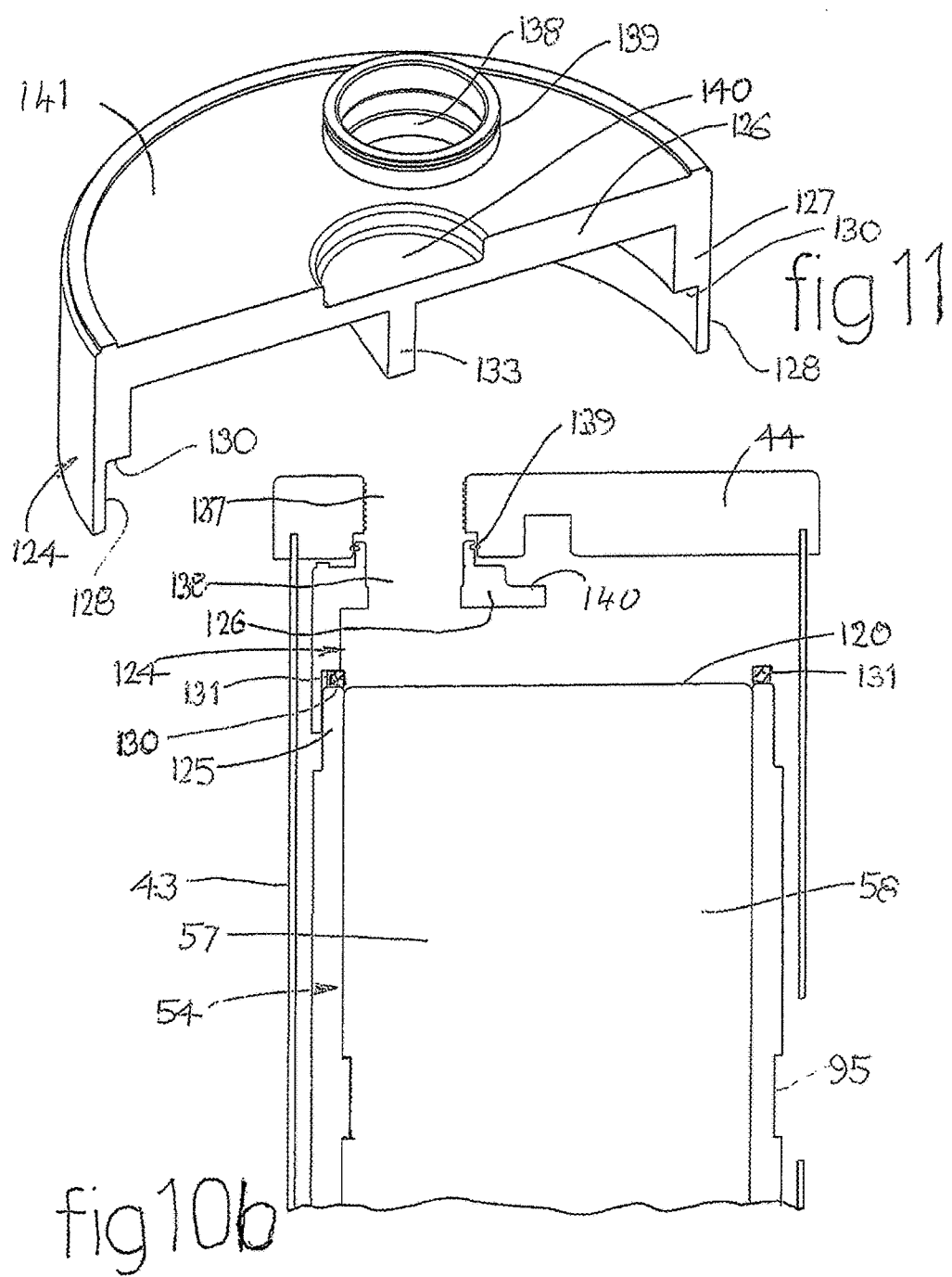

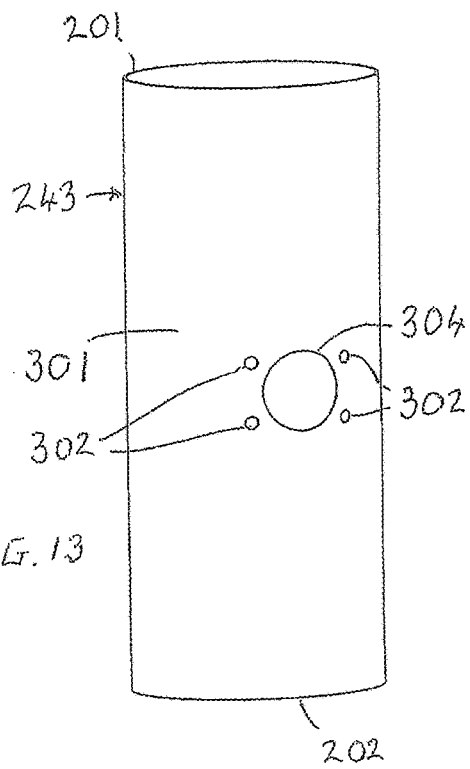
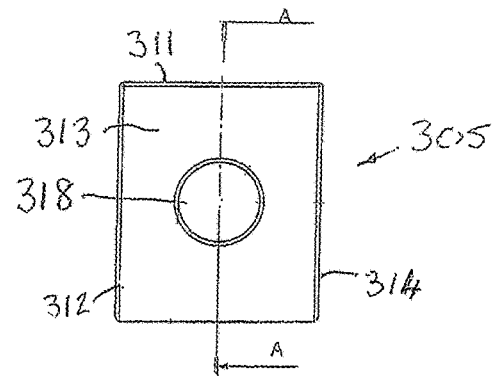
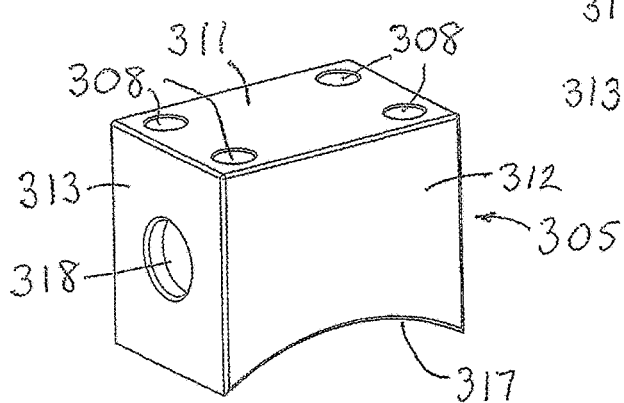
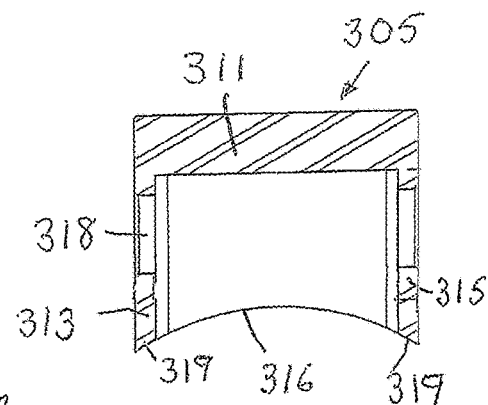
FIG. 13
FIG. 15
FIG. 14
FIG. 16

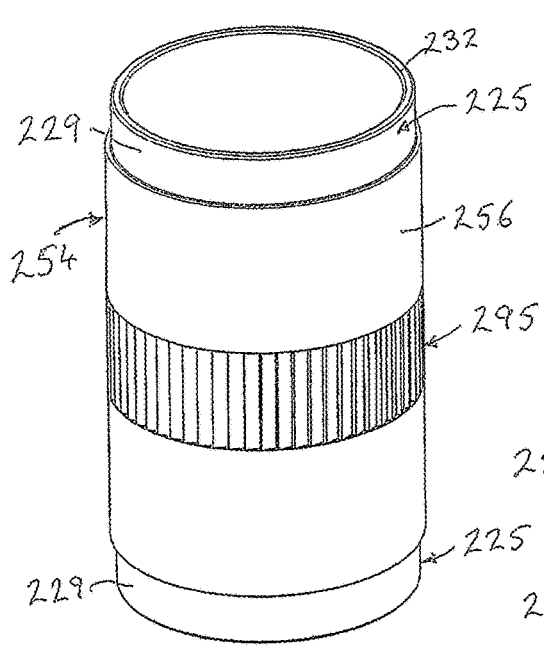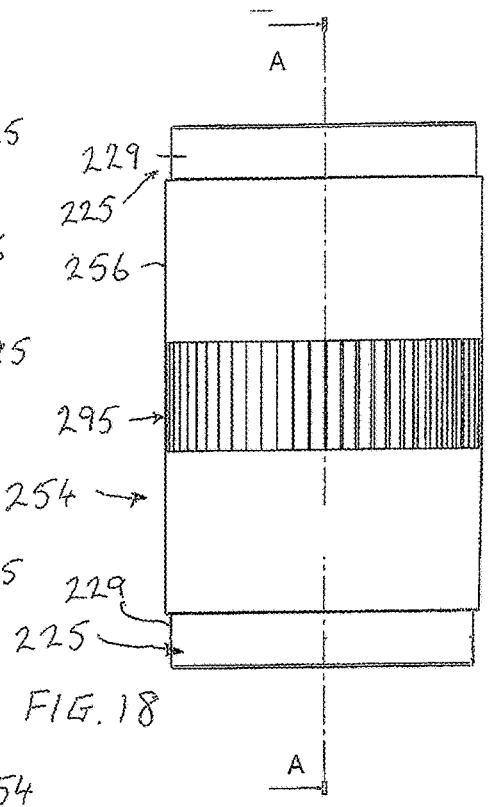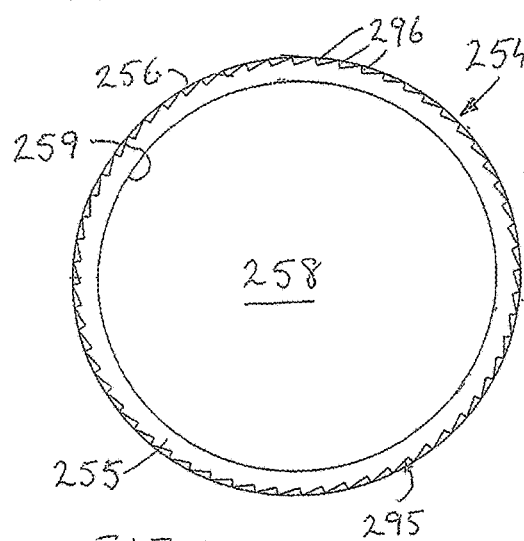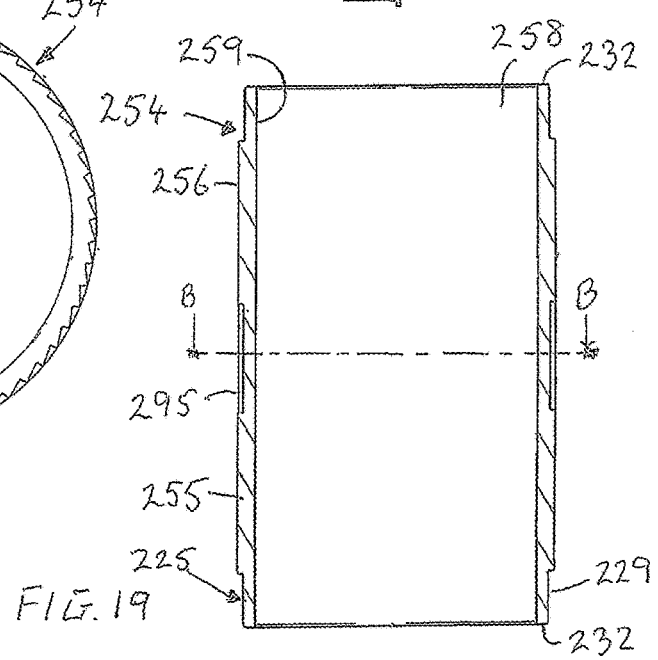

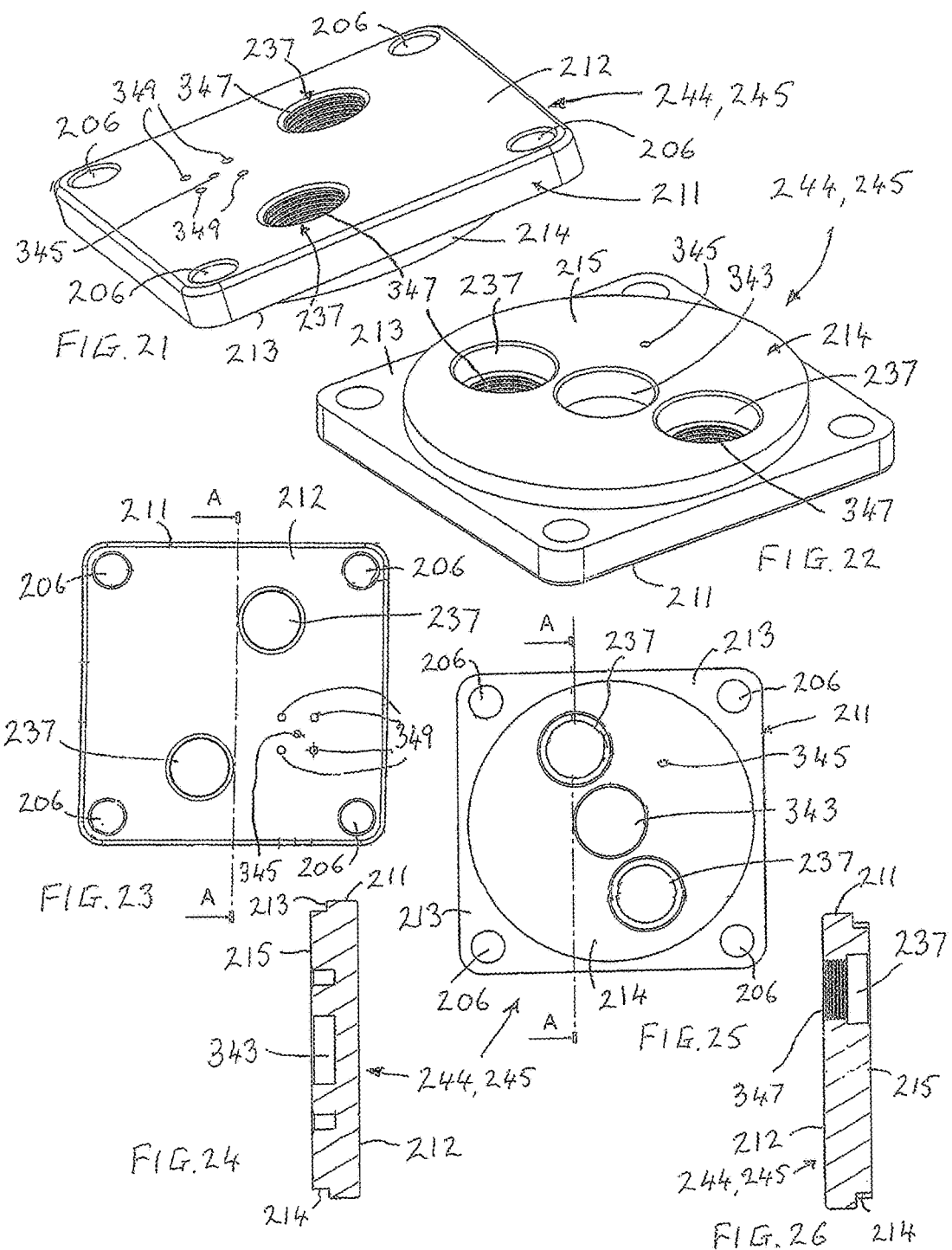

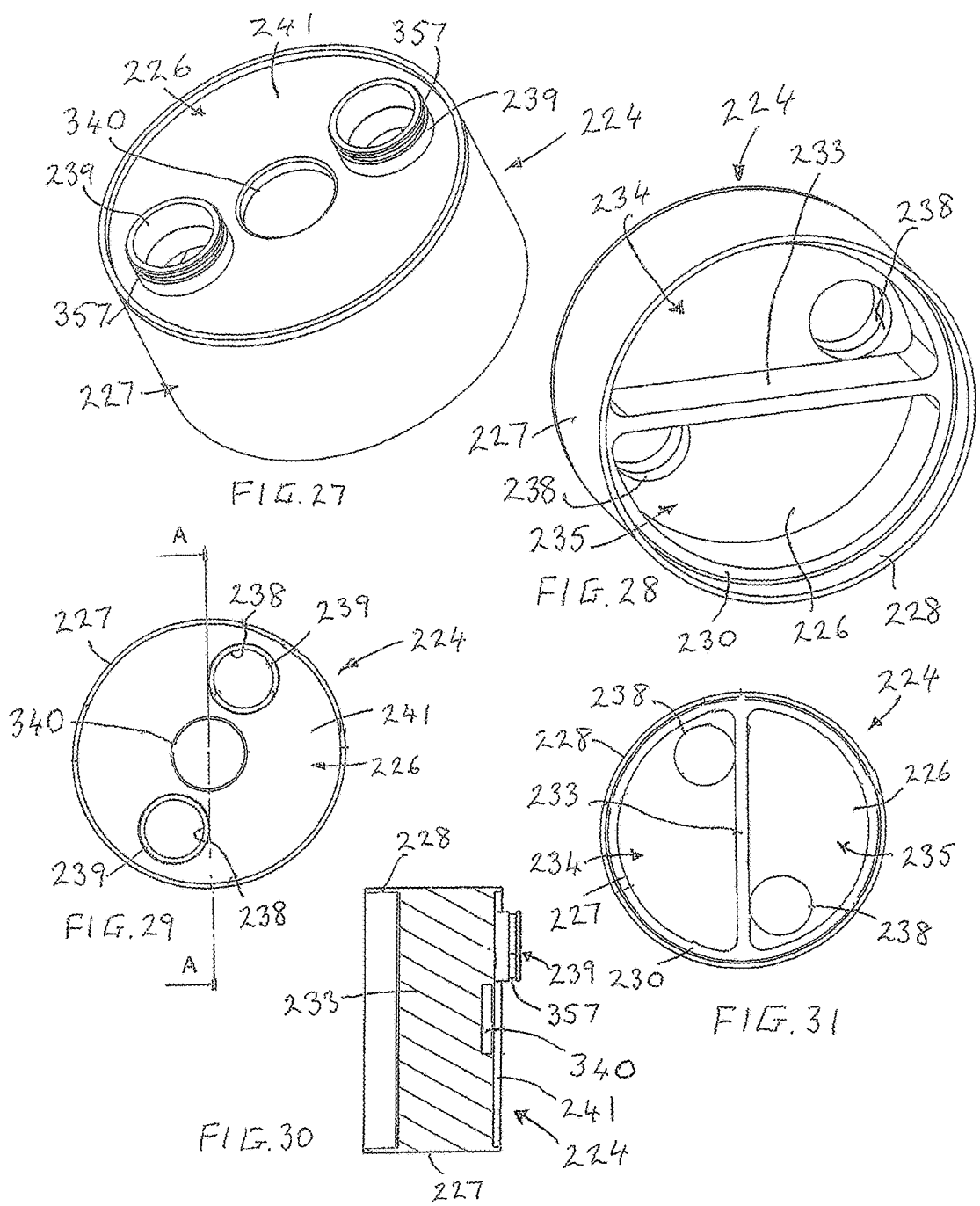

ROTARY ADSORBENT DRYERS FOR COMPRESSED GAS

FIELD OF THE INVENTION

The present invention relates to improvements in drying compressed gas exiting a gas compressor, particularly but not exclusively, a lubricant flooded or liquid injected rotary compressors including screw compressors and to an improved rotary adsorbent compressed gas drying device for use in such applications and in other applications.

BACKGROUND OF THE INVENTION

Rotary adsorbent dryers are quite commonly used for drying ambient air for electronic, pharmaceutical and other industrial applications. U.S. Pat. Nos. 2,926,502 and 2,993,563 (Munters et al) disclose applications of rotary adsorbent dryers for drying compressed air in oil/lubricant free rotary compressors. U.S. Pat. No. 7,166,149 (Dunne et al) discloses an application of a rotary adsorbent dryer for drying compressed gas discharged from turbo compressors. U.S. Pat. No. 8,349,054 and patent application no. 2011/0132191 (Fredenhagen et al) discloses a construction for a rotary adsorbent compressed gas dryer. Rotary adsorbent compressed gas dryers have generally not been able to be used for drying compressed gas, typically air, discharged from oil or lubricant injected rotary compressor systems because the operating temperature of such compressor systems has not been high enough to easily regenerate the adsorbent media in the rotary adsorbent dryer. Known and conventional rotary adsorbent dryers often require the input of additional energy and use refrigerant means in their operation to achieve acceptable compressed gas drying performance. While the present invention is particularly useful for drying compressed gas exiting lubricant (liquid) flooded or injected rotary gas compressors, it is not necessarily limited to this application. Further, known rotary adsorbent dryers typically comprise a rotating drum driven on a central axle or drive shaft, the drum containing desiccant type media capable of absorbing liquid (moisture) from a gas and giving up liquid (moisture) to a gas flowing through the media, the rotary adsorbent dryer having at least two gas flow paths through desiccant media, one being capable of giving up liquid (moisture) to the media and the other capable of removing liquid (moisture) from the media, the media in the drum being progressively presented to the respective gas flows upon rotation of the drum.

It is desirable to provide an improved system for drying compressed gas discharged from a gas compressor, preferably but not exclusively, an oil/lubricant flooded or injected rotary compressor configuration utilising a rotary adsorbent dryer, and an improved rotary adsorbent dryer for use therewith.

SUMMARY OF THE INVENTION

The present invention, in a first aspect, provides a rotary adsorbent dryer including a stationary outer housing having spaced stationary end walls, a rotor rotatably mounted within said outer housing for rotation about a rotation axis, the rotor having substantially open opposed ends, each of which is positioned adjacent to a respective one of the end walls of the outer housing, a plurality of first compressed gas flow passages passing through the end walls providing, in use, compressed gas flow to or from a respective substantially open end of the rotor, and a drive arrangement for rotating the rotor about the rotation axis, the drive arrangement being cooperable with an outer circumferential region of the rotor.

The rotor of the rotary adsorbent dryer is preferably a rotary drum which includes a desiccant media material, and a drive shaft is excluded from extending axially through said rotor. Advantages of this are that more space is available within the drum for the desiccant media material for more effective drying, and that it is not necessary to provide a sealing arrangement for such a drive shaft.

Preferably, the drive arrangement provides discontinuous movement of the rotor whereby said rotor is stationary for a predetermined period of time between periods of discontinuous rotational movement.

In one embodiment, the rotor includes a continuous annular wall extending axially between the open ends and the stationary outer housing includes a continuous outer annular wall of greater diameter than the annular wall of the rotor whereby an annular space is formed therebetween.

A seal arrangement may be provided which is operable to prevent gas flow axially along said annular space. The seal arrangement may include at least one seal member operably engaging at least one end region of the rotor, and an urging arrangement provides an urging force for urging the at least one seal member into operable sealing engagement with the at least one end region of the rotor while the rotor is stationary.

According to a second aspect of the invention, there is provided a rotary adsorbent dryer including spaced first and second stationary end walls, a rotor rotatably mounted between the spaced first and second stationary wall means for rotation therebetween, the rotor having substantially open opposed ends, a plurality of first compressed gas flow passages passing through the first and second stationary end walls providing, in use, compressed gas flow to or from a respective substantially open end of the rotor, a drive arrangement for rotating the rotor about the rotation axis in a discontinuous motion whereby the rotor is stationary for a predetermined period of time between periods of rotational movement, the rotary adsorbent dryer further including a seal arrangement including at least one seal member operably engaging at least one end region of the rotor, and an urging arrangement provides an urging force for urging the at least one seal member into operable sealing engagement with the at least one end region of the rotor while the rotor is stationary.

Preferably, the urging arrangement is arranged to relax the urging force when the rotor is rotationally moved. This has the advantage that sealing friction forces are substantially reduced during rotational movement of the rotor and such rotational movement is not substantially impeded by the sealing arrangement, although some sealing may still take place In one embodiment, the at least one seal member of the sealing arrangement may engage at least a peripheral end surface of the rotor.

The sealing arrangement may also include a sealing portion engageable with an end surface of a desiccant media material positioned within the rotor. The sealing portion preferably includes at least two radial legs meeting at a centre location. In one preferred embodiment, a pair of first compressed gas passages are provided in each end wall, and the sealing portion has a pair of radial legs. In another embodiment, the end walls may have three first gas passages, and the sealing portion may have three radial legs.

The urging arrangement may include at least one floating head member located at at least one end of the rotor and cooperable with the seal member located at said at least one end of the rotor, the at least one floating head member being partially axially movable only when the rotor is stationary. The at least one floating head member is preferably movable between a sealing position in which the seal member is urged into operable sealing arrangement with the peripheral end surface of the rotor, and a relaxed position in which the urging force on the respective sealing member is relaxed.

The urging arrangement may include a resilient member, such as an urging spring, which acts between the fixed end wall and the floating head member at said at least one end of the rotor.

In one embodiment, a floating head member is provided at each end of the rotor, each floating head member being axially movable between a sealing position in which a respective seal member is urged into operable sealing engagement with the peripheral end surface of the respective end of the rotor, and a relaxed position in which the urging force on the respective sealing member is relaxed.

In another embodiment, a floating head member is provided at only one end of the rotor. In this case, a seal member may be provided at the opposite end of the rotor which is not directly acted upon by an urging force. When the urging force acting on the seal member at said one end of the rotor is relaxed, the sealing engagement of the seal member at said opposite end will also be relaxed to some extent.

Preferably, the at least one floating member is mounted to be non-rotational about the rotation axis of the rotor, the floating head member further including a plurality of second gas flow passages, each cooperable with a respective first gas flow passage passing through a respective stationary end wall, and a sliding seal operable between each pair of cooperating first and said second gas flow passages.

The drive arrangement for providing discontinuous movement preferably includes a controller. The controller may also control the urging arrangement so that the discontinuous movement of the rotor is synchronised with the application and relaxing of the urging force.

The controller may control the discontinuous movement of the rotor in such a manner that the predetermined period of time that the rotor is stationary is selectably variable.

In one embodiment, the drive arrangement includes a ratchet ring having a plurality of ratchet teeth connected to, or integrally formed in, an outer peripheral surface of the rotor, and at least one movable ratchet pawl engageable with the ratchet teeth of the ratchet ring to cause the rotor to rotate.

The controller of the drive arrangement may actuate the at least one ratchet pawl selectably to vary rotational speed of the rotor.

The rotary adsorbent dryer may include at least one bearing ring surrounding and supporting an outer circumferential surface zone of the rotor. The or each outer surface zone of the rotor may carry a dry lubricant surface coating cooperable with the or each said bearing ring.

The rotor may be supported for rotation by idler rollers engaging the cylindrical outer wall surface of the rotor.

The rotary adsorbent dryer may further include: an enclosed chamber located outwardly of an adjacent one of the spaced end walls; and a heat exchanger arrangement positioned in the enclosed chamber, whereby the compressed gas flow to the rotary adsorbent dryer passes through the heat exchanger arrangement through a further flow passage formed in a first end wall of the spaced end walls and through a first pipe leading to a gas flow passage in a second wall of the spaced end walls, the second end wall being spaced from the first end wall.

According to a third aspect of the invention, there is provided a rotary adsorbent dryer comprising:

a stationary outer housing having spaced stationary end walls, a rotor rotatably mounted within said outer housing for rotation about a rotation axis, the rotor having substantially open opposed ends, each of which is positioned adjacent to a respective one of the end walls of the outer housing, a plurality of first compressed gas flow passages passing through the end walls providing, in use, compressed gas flow to or from a respective substantially open end of the rotor, and a drive arrangement for rotating the rotor about the rotation axis, the rotary adsorbent dryer further including:

an enclosed chamber located outwardly of an adjacent one of the spaced end walls; and a heat exchanger arrangement positioned in the enclosed chamber whereby the compressed gas flow to the rotary adsorbent dryer passes through the heat exchanger arrangement through a further flow passage formed in a first end wall of the spaced end walls and through a first pipe leading to a gas flow passage in a second wall of the spaced end walls, the second end wall being spaced from the first end wall.

In one embodiment, the enclosed chamber and the heat exchanger are contained within a common housing assembly for the rotary dryer. In this case, the common housing may include a further end wall member spaced from the first end wall and a further annular wall extending between the first end wall and the further end wall member, the first end wall, the further annular wall and the further end wall forming said enclosed chamber.

A heater may be located in the first pipe whereby heat can be applied to gas flow in the first pipe.

The gas flow passage means in the second end wall may provide a first gas flow path through said rotor to the gas flow passage means in the first wall leading through the heat exchanger arrangement to the enclosed chamber.

According to a fourth aspect of the invention there is provided a compressed gas dryer incorporating a rotary adsorbent dryer according to any of the first to third aspects of the invention.

The rotary adsorbent dryer may have at least two compressed gas flow paths therethrough, a first one of the compressed gas flow paths being arranged to regenerate desiccant media in the rotary adsorbent dryer by absorbing moisture from the desiccant media into the compressed gas flow along the first gas flow path, and a second one of the compressed gas flow paths being arranged to give up moisture in compressed gas flowing along the second gas flow path to the desiccant media whereby the compressed gas flowing along the second path is discharged from the rotary adsorbent dryer, dryer than when it entered the rotary adsorbent dryer.

The compressed gas dryer may include: first cooling means to cool compressed gas discharged from the gas compressor; first moisture separation means to receive cooled compressed gas flow from said first cooling means to trap and discharge a first condensed moisture flow therefrom; and heating means to heat compressed gas flowing into said rotary adsorbent dryer along said first path.

According to a fifth aspect of the invention there is provided a compressed gas dryer for drying compressed gas discharged from a gas compressor, said compressed gas dryer including:

a rotary adsorbent dryer having at least two compressed gas flow paths therethrough, a first path being arranged to regenerate desiccant media in said rotary adsorbent dryer by absorbing moisture from the desiccant media into the compressed gas flow along the first path, and a second path being arranged to give up moisture in compressed gas flowing along said second path to said desiccant media whereby the compressed gas flowing along the second path is discharged from the rotary adsorbent dryer, dryer than when it entered the rotary adsorbent dryer;

first cooling means to cool compressed gas discharged from the gas compressor; first moisture separation means to receive cooled compressed gas flow from the first cooling means to trap and discharge a first condensed moisture flow therefrom; and heating means to heat compressed gas flowing into the rotary adsorbent dryer along the first path.

The heating means may include a first heat exchanger whereby the compressed gas flowing into the rotary adsorbent dryer along the first path is heated by heat exchange with a second heated gas flow. The second heated gas flow may be located down stream of the rotary adsorbent dryer after passing along the first path.

The second heated gas flow may be compressed gas exiting the rotary compressor arrangement.

The heating means may include an external heat source. The external heat source may be electrically based.

The compressed gas dryer may further include second cooling means to cool compressed gas discharged from the rotary adsorbent dryer along the first path; and second moisture separation means to receive cooled compressed gas flow from the second cooling means to trap and discharge a second condensed moisture flow therefrom.

The compressed gas flow discharged from the second moisture separation means may form the compressed gas flow along the second path of the rotary adsorbent dryer.

The first cooling means and the second cooling means are preferably unrefrigerated cooling means.

The first cooling means may include a first heat exchanger, the first heat exchanger cooling the compressed gas discharged from the rotary compressor arrangement by either: (i) heat exchange with ambient air; or (ii) by heat exchange with a counter current compressed gas flow.

The first cooling means may be formed by a counterflow heat exchanger, the compressed gas flow discharged from the rotary compressor arrangement being cooled in the counterflow heat exchanger before being passed to the first moisture separation means, the compressed gas flow exiting the first moisture separation means to be passed to the counterflow heat exchanger to be passed in heat exchange relation with the compressed gas flow discharged from the rotary compressor arrangement.

The first cooling means may be formed by a first heat exchanger exchanging heat with ambient air, the compressed gas discharged from the first cooling means being passed through the first moisture separation means, and a first flow path in a first counterflow heat exchanger, the compressed gas exiting from the first flow path of the first counterflow heat exchanger being heated prior to passing into the first path of the rotary adsorbent dryer.

Compressed gas exiting from the first path of the rotary adsorbent dryer may be passed to a second flow path of the first counterflow heat exchanger in heat exchange with the first flow path of the first counterflow heat exchanger.

Compressed gas exiting the second flow path of the first counterflow heat exchanger may be cooled in said second cooling means prior to being passed to said second moisture separation means.

The rotary adsorbent dryer of the compressed gas dryer of the fourth aspect of the invention may include a stationary outer housing, a rotor with open opposed ends rotatably mounted within the outer housing for rotation about a rotation axis perpendicular to the opposed ends, the outer housing including stationary end walls adjacent each of the opposed open ends of the rotor, compressed gas flow passages passing through the end walls providing, in use, compressed gas flow to or from a respective open end of the rotor, the gas flow passages being arranged in at least two spaced pairs, and drive means for rotating said rotor about said rotation axis, the drive means being cooperable with an outer circumferential region of said rotor.

According to a sixth aspect of the invention, there is provided an oil or lubricant injected rotary compressor arrangement including a rotary compressor and a compressed gas dryer according to the fourth or fifth aspects of the invention.

Further preferred features and aspects will be apparent from the following description given in relation to the accompanying drawings.

BRIEF DESCRIPTION OF THE DRAWINGS

FIG. 10*b* illustrates a view similar to FIG. 10*a* but taken on a different sectional line;

FIG. 11 is a diametral sectional perspective view of the floating head member shown in FIGS. 10*a* and 10*b;*

FIG. 13 is an isometric view of the outer housing of the dryer of FIGS. 12*a*, 12*b* and 12*c;*

FIG. 14 is an isometric view of the ratchet block of the dryer of FIGS. 12*a*, 12*b* and 12*c;*

FIG. 15 is an end view of the ratchet block;

FIG. 16 is a section on the line A-A of FIG. 15;

FIG. 17 is an isometric view of the rotor of the dryer of FIG. 12;

FIG. 18 is a side view of the rotor;

FIG. 19 is a section on the line A-A of FIG. 18;

FIG. 20 is a section on the line B-B of FIG. 18;

FIG. 21 is a top isometric view of one of the end plates of the dryer of FIGS. 12*a*, 12*b* and 12*c;*

FIG. 22 is an underneath isometric view of the end plate of FIG. 21;

FIG. 23 is a top plan view of the end plate of FIG. 21

FIG. 24 is a section on the line A-A of FIG. 23;

FIG. 25 is a bottom plan view of the end plate of FIG. 21;

FIG. 26 is a section on the line A-A of FIG. 25;

FIG. 27 is a top isometric view of a floating head member of the dryer of FIG. 12;

FIG. 28 is an underneath isometric view of the floating head member of FIG. 13;

FIG. 29 is a top plan view of the floating head member of FIG. 27;

FIG. 30 is a section on the line A-A of FIG. 29; and

FIG. 31 is a bottom plan view of the floating head member of FIG. 27.

DETAILED DESCRIPTION OF PREFERRED EMBODIMENTS SHOWN IN THE DRAWINGS

Figure 1:
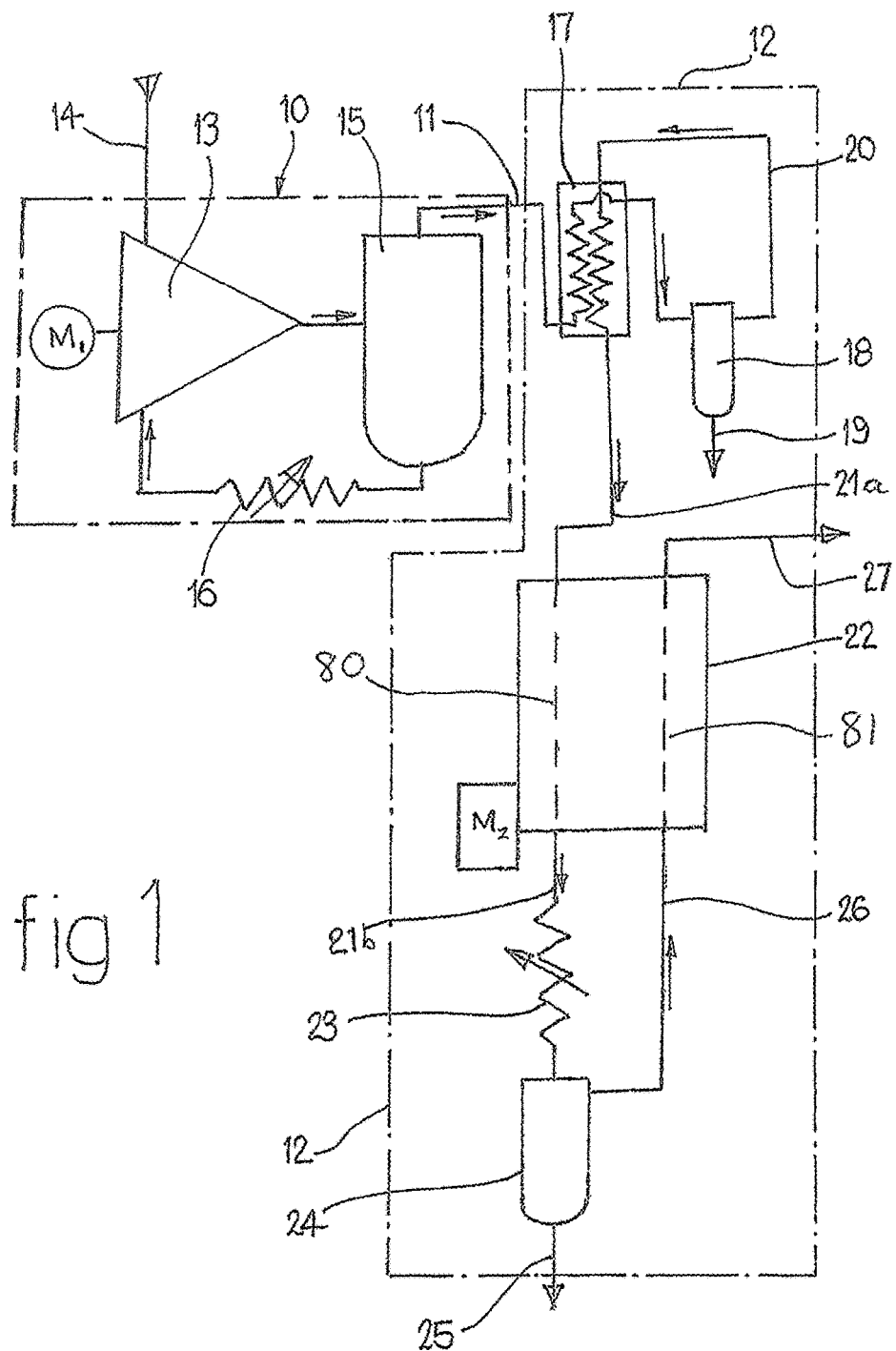
FIG. 1 is a schematic layout drawing of a first preferred embodiment of a drying system for drying compressed gas discharged from an oil/lubricant injected rotary compressor.

Referring to FIG. 1, a rotary oil or lubricant injected screw compressor is shown at 10 discharging compressed gas, typically compressed air, at 11 to be dried in a dryer system 12. The rotary screw compressor configuration 10 may also be any rotary compressor of the oil or lubricant injected type. For the sake of this disclosure, the screw compressor system 10 might include a screw compressor 13 driven by a motor M receiving air to be compressed at 14 with the screw compressor 13 discharging compressed air and entrained injected oil/lubricant into a separator vessel 15. The oil/lubricant being largely separated from the compressed air in the vessel 15 and returned via a cooler 16 to an inlet region of the screw compressor 13. The foregoing describes a simple injected or flooded screw compressor system, however the present invention relates primarily to the dryer system 12 described hereafter and the rotary screw compressor configuration can be any oil/lubricant injected rotary compressor including, but not limited to, vane and scroll type compressors.

The dryer system 12 includes a counterflow heat exchanger 17 with the compressed gas containing moisture discharged from the compressor configuration 10 passing therethrough where it is cooled, the cooled compressed gas being then passed to a moisture trap or separator 18 to collect and remove condensed moisture via a drain 19. The compressed gas that is dryer is then returned via line 20 to the counterflow heat exchanger 17 to be passed in heat exchange relationship with the discharge from the compressor configuration 10. The dryer gas passing through the counterflow heat exchanger 17 is heated by the gas discharged from the compressor configuration 10 to be passed therefrom, via line 21a, to a rotary adsorbent dryer 22. As the hot compressed gas from line 21 passes through the rotary adsorbent dryer 22 along a first gas flow path 80, it dries the desiccant media in the dryer 22 and regenerates it. In doing so, the compressed gas in flow path 80 passing through the dryer 22, picks up moisture as it dries the desiccant media in the dryer 22, and leaves via line 21b relatively hot and wet. This warm wet compressed gas in line 21b leaving the dryer 22, is passed via an after cooler 23 and a moisture trap or separator 24 where condensed liquid (moisture) is discharged via drain 25. The cooler but saturated compressed gas is then returned via line 26 through a flow path formed in a sector of the rotary adsorbent dryer 22 that has previously been dried as it passes through the flow defined by lines 21a and 21b. In passing through a second gas flow path 81 in a rotor of the rotary adsorbent dryer 22, the compressed gas is dried and discharges at line 27 as dry compressed gas.

The moisture gm per kilogram of compressed gas (air) at 20 might be 2-3 gm/kg, at 21a before the dryer 22 might be similarly 2-3 gm/kg, at 21b after the drier 22 might be 5 gm/kg, at 26 before the drier 22, might be 3 gm/kg and at discharge 27, might be 0.5 gm/kg. The dryer 12 represented by FIG. 1 only requires the input of energy to rotate the rotor of the rotary dryer 22, for example by a second motor $M_2$, or the use of refrigeration techniques. Any coolers used, can be effective with cooling effects provided by ambient air heat exchangers.

Figure 2:
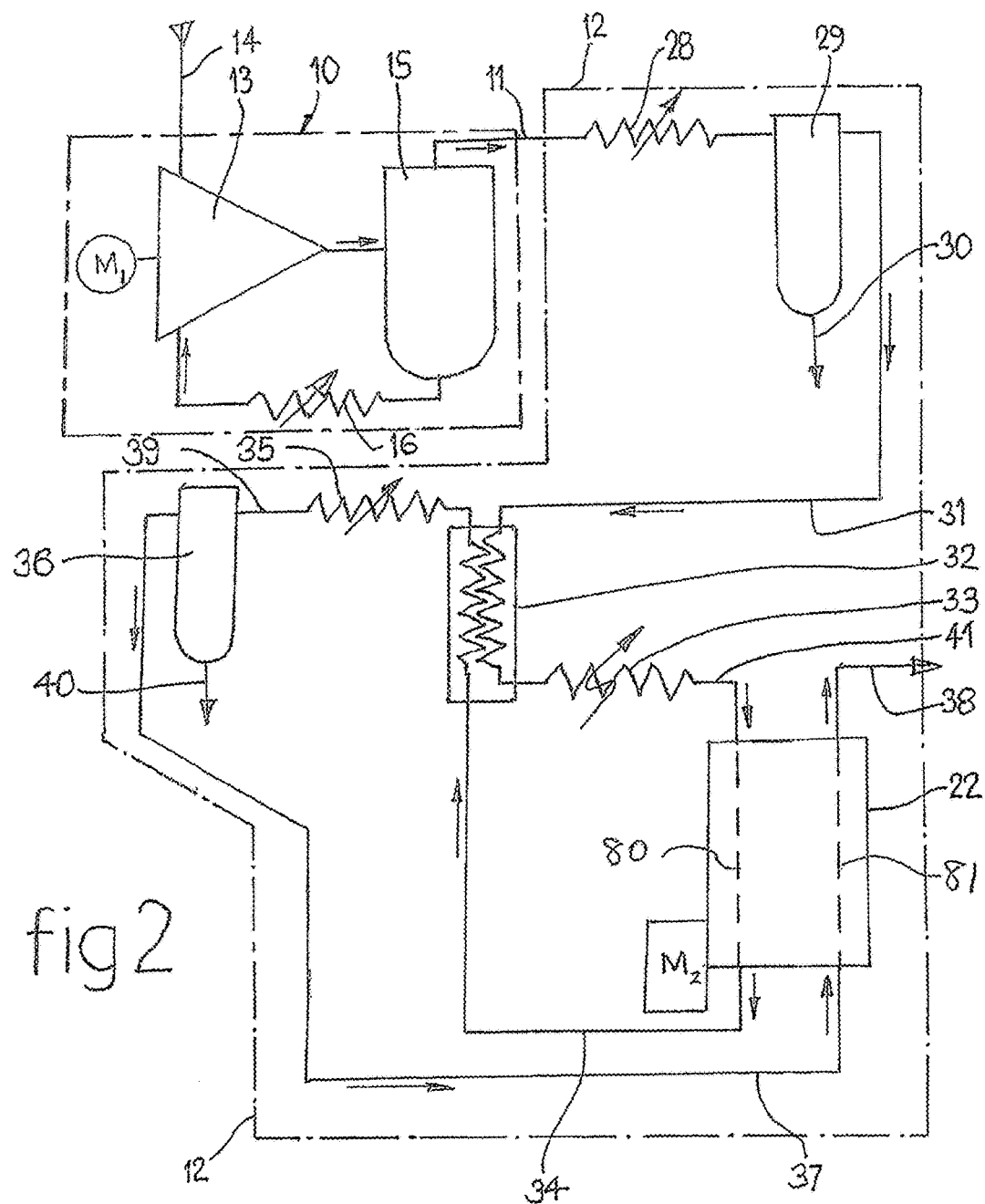
FIG. 2 is a schematic layout drawing similar to FIG. 1 showing a second preferred embodiment.

FIG. 2 illustrates a possible variant of the dryer system 12 shown in FIG. 1 where like elements and features have been given the same reference number. In this preferred embodiment, the compressed gas with entrained moisture in vapour form discharged from the compressor configuration 10 is passed through a cooler 28 to condense the moisture in the compressed gas flow to remove the condensate via passage through a moisture trap or separator 29, the condensate collected being discharged via a drain 30. The cooled and dryer compressed gas leaving the moisture trap 29 is passed via line 31 to a counterflow heat exchanger 32. The compressed gas leaving the counterflow heat exchanger 32 via line 41 is heated in a heat exchanger 33 before being passed through the first gas flow path 80 of the rotary adsorbent dryer 22. The hot stream or flow of compressed gas passing through the rotary adsorbent dryer 22 regenerates or dries the desiccant media within the rotor of the dryer 22 and absorbs moisture before leaving via line 34 to return to the counterflow heat exchanger 32. This hot compressed gas flow tends to heat the flow of compressed gas in the line 31 before it is heated further by the heat exchange in heat exchanger 32. The compressed gas leaving the counterflow heat exchanger 32 via line 39 is cooled by being passed through a cooler device 35 with any moisture condensed being caught and separated in a moisture trap or separator 36. The moisture is drained at 40 and the compressed gas is passed via line 37 to the rotary adsorbent dryer 22. The compressed gas passing through the dryer 22 along second gas flow path 81 gives up moisture to the desiccant media as the compressed gas is passed to its discharge point 38 where it is substantially dry. As with the embodiment of FIG. 1, no refrigeration is required, however, some energy is required to rotate the rotor of the rotary dryer 22 a small amount of heat energy may need to be used with heater 33 in this embodiment.

Figure 3:
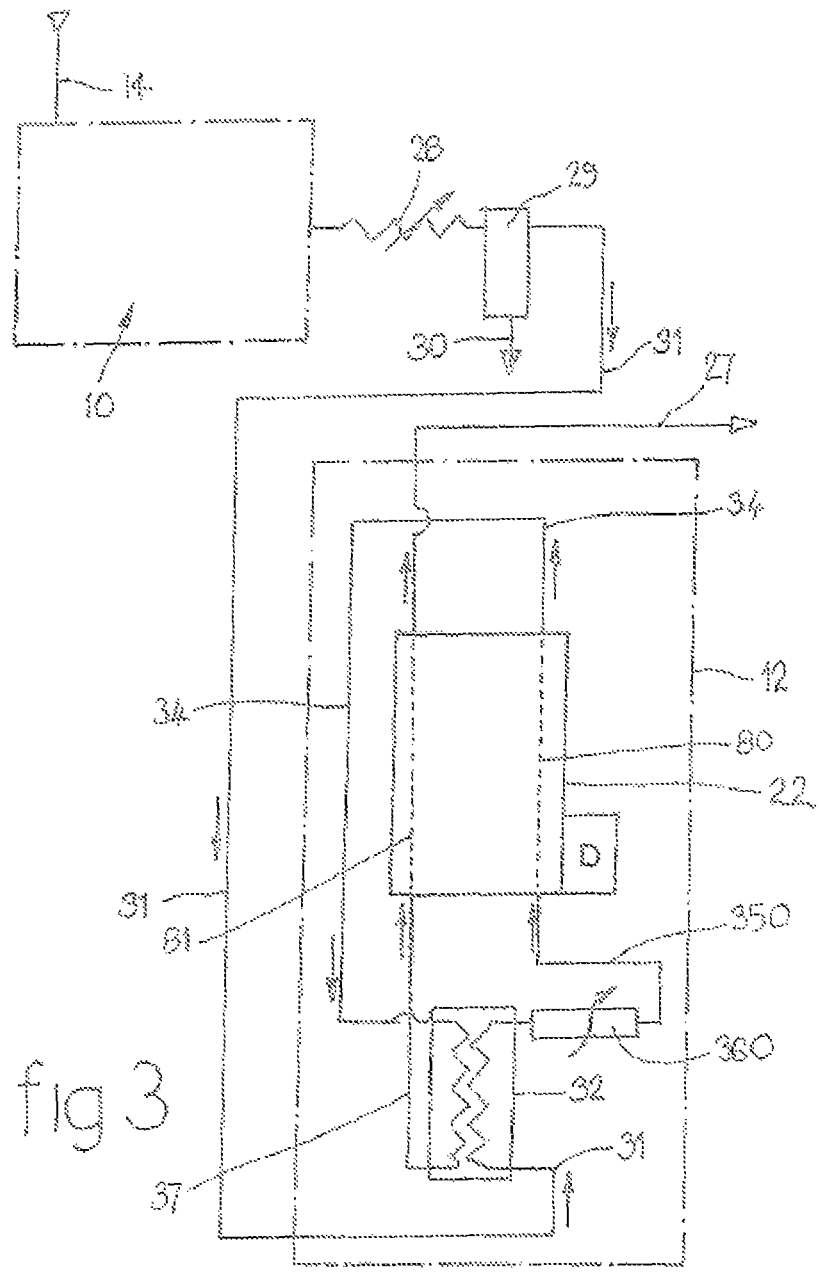
FIG. 3 is a schematic lay out drawing similar to FIGS. 1 and 2 showing a third preferred embodiment.

FIG. 3 illustrates a still further possible variant to the dryer systems 12 shown in FIGS. 1 and 2 where like elements and features have been given the same reference number. The rotary compressor configuration 10, may be any known rotary gas compressor of the oil or lubricant injected or flooded type including the basic configurations illustrated in FIGS. 1 and 2. The compressed gas with entrained moisture in vapour form discharged from the compressor configuration 10 is passed through a cooler 28 to condense the moisture in the flow. The condensate thus formed is removed in a moisture trap or separator 29, the condensate being collected and discharged via a drain 30. The cooled and somewhat dried compressed gas leaving the moisture trap 29 is passed via line 31 to a counter current or flow heat exchanger 32. In the heat exchanger 32 the gas flow in line 31 is heated by heat exchange with gas flow in line 34 after it has passed along the first gas flow path or regeneration flow path 80 through the rotary adsorbent dryer 22, the flow along the regeneration flow path 80 coming from the line 31 and line 350. A small external heating device 360 is provided to enable heat to be selectably added to the gas flow in lines 31, 350. The heated gas flow passing along the regeneration flow path 80 regenerates or dries the desiccant media within the rotor 22. The compressed gas flow in line 34 passes through the heat exchanger 32 and via line 37 into the rotor of the rotary dryer 22, flowing along the second gas flow path 81 giving up any remaining moisture to the regenerated desiccant media in the rotor. The dried compressed gas flow exits the drier system 12 via line 27. A drive arrangement D is provided to rotate the rotor as further described hereafter, such that the desiccant media is repeatedly used to absorb moisture from the gas flow along the second path 81 and be regenerated by gas flow along the path 80. The dryer system 12 illustrated in FIG. 3 is particularly useful for smaller machines.

Figure 4:
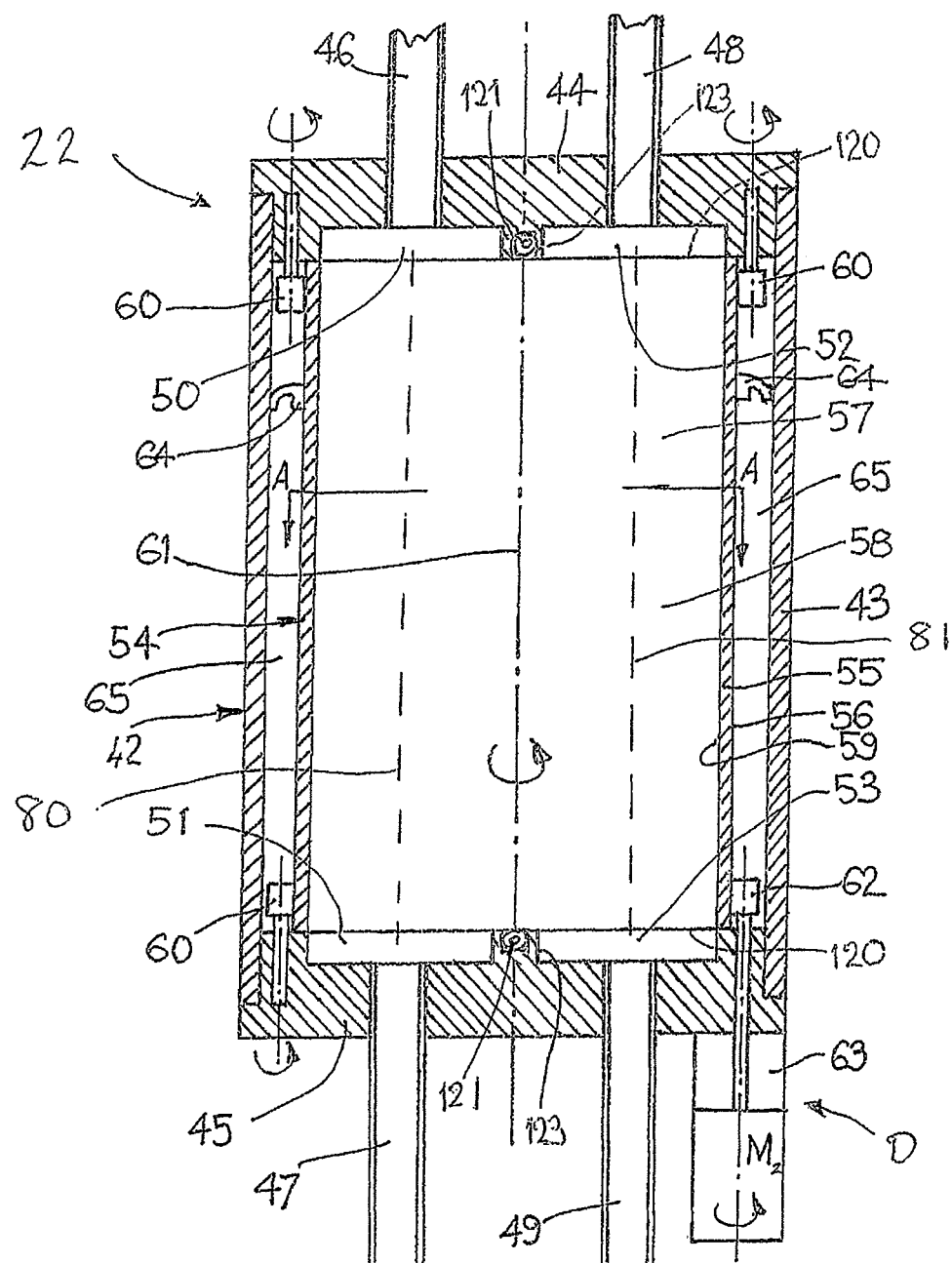
FIG. 4 is a longitudinal diametral section view of one embodiment of a rotary adsorbent dryer.
Figure 5:
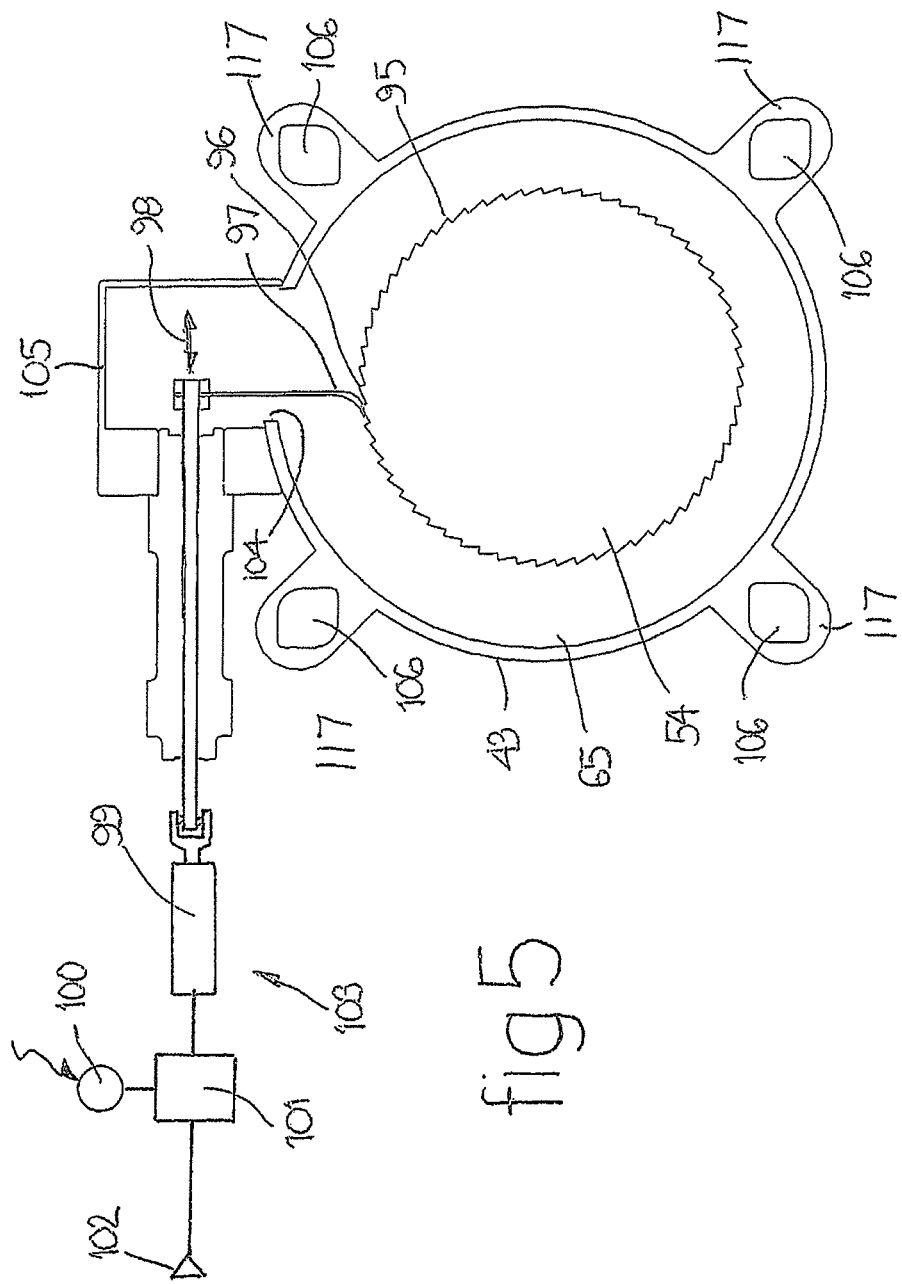
FIG. 5 is a layout schematic view of an alternative drive means for rotating the rotor of the dryer.
Figure 6:
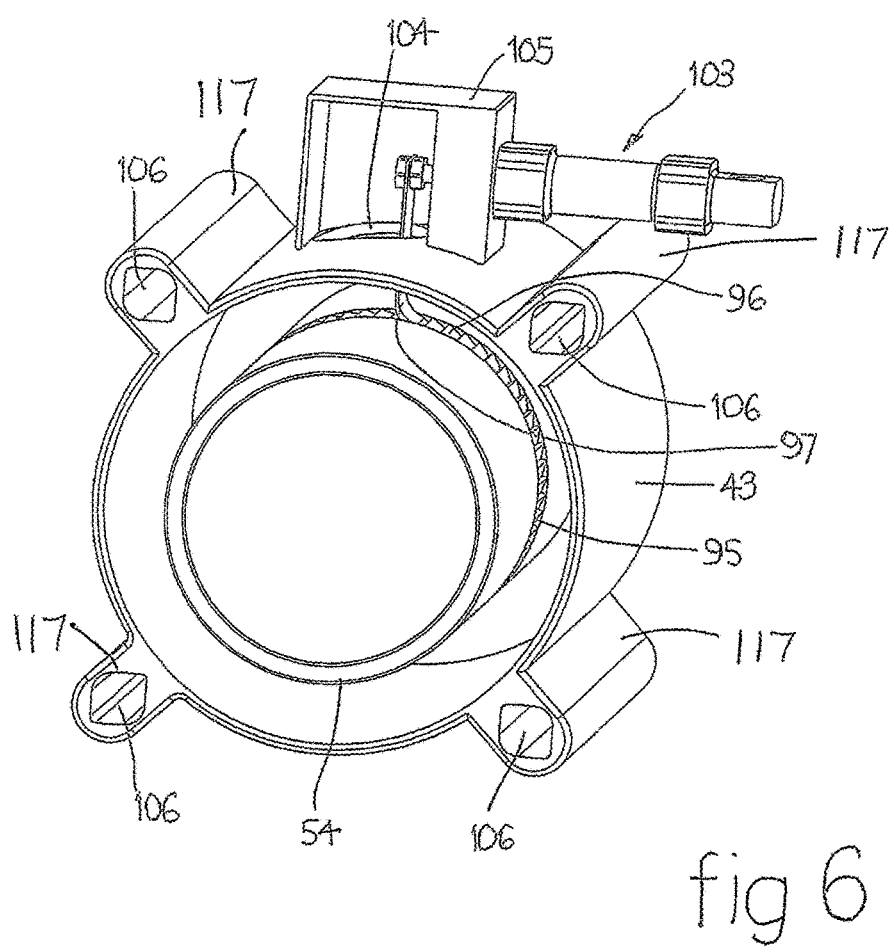
FIG. 6 is a perspective view illustrating the alternative drive means shown in FIG. 5.
Figure 7:
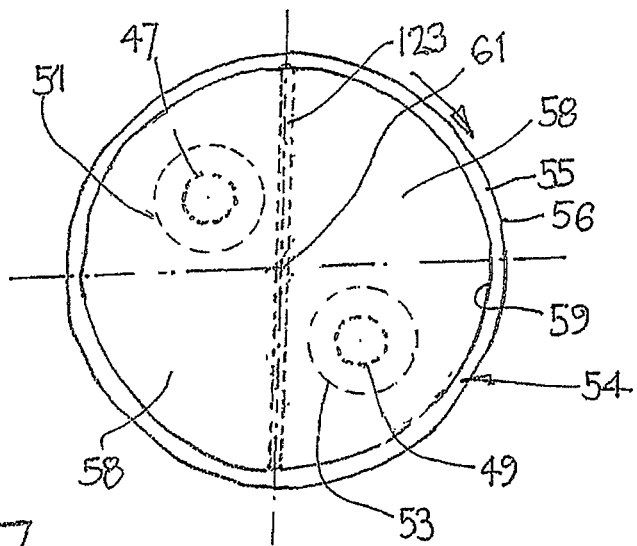
FIGS. 7 and 8 are transverse cross-sectional views of different preferred embodiments of the rotating drum or rotor of the rotary adsorbent dryer shown in FIGS. 4 to 6.
Figure 8:
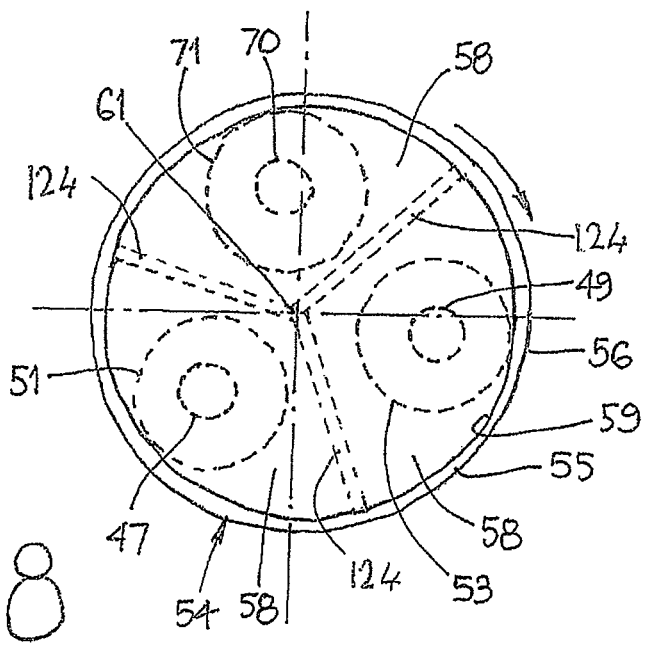

FIGS. 4 to 8 illustrate preferred forms of the rotary adsorbent dryer 22 for possible use in the rotary dryer system configurations shown in FIGS. 1 to 3. FIG. 4 is a longitudinal diametral section view through the rotary dryer 22. FIG. 7 is a transverse section view along line A-A of FIG. 4, and FIG. 8 is a transverse section view similar to FIG. 7 but showing a possible variant.

The rotary adsorbent dryer 22 comprises a fixed and stationary outer casing 42 having an annular outer wall 43 and spaced stationary end walls provided by opposed end caps 44, 45. Conveniently, each of the end caps 44, 45 is fixed and sealed to a respective one of the ends of the annular outer wall 43. The end caps 44, 45 may be secured by any suitable means to the annular outer wall 43. Multiple compressed gas flow pipes 46, 47, 48 and 49 are secured to and extend through the end caps 44, 45 and are arranged in pairs 46, 47 and 49, 48 to establish first and second gas flow paths 80 and 81 for compressed gas through the interior of the rotary adsorbent dryer 22. The compressed gas flow pipes 46-49 lead to recessed gas distribution chambers 50, 51, 52 and 53 in the end caps 44, 45. In the drawing, the periphery of the chambers 50 to 53 is generally circular but other shapes are possible including a part annular shaped groove having a relatively wide dimension in the radial direction and extending for part of the peripheral extent of the inner surface of the end caps 44, 45. Within the internal space formed by the end caps 44, 45 and outer wall 43, a rotor 54 is provided having an annular wall 55 having a cylindrical outer surface 56, and an internal zone 58. In the embodiment of FIGS. 4 and 7, the inner surface 59 of the wall 55 is generally cylindrical providing a generally cylindrical space containing any suitable desiccant media material 57 with opposed planar ends 120. In the embodiment of FIG. 7, a diametral partition wall 123 divides the internal zone of the end caps 44, 45 into equally two sized sectors. In the embodiment of FIG. 8, three radially extending partition walls 124 divide the internal space of the end caps 44, 45 into three equal segments. The rotor 54 is supported on one of the end caps 45 but the ends of the rotor are closely adjacent the inner surfaces of the end caps 44, 45. Seal means (not shown) may be provided, as desired, between the end caps 44, 45 and end surfaces of the rotor 54. The outer surface 56 is supported by and retained in position by idler rollers 60 so that the rotor 54 can rotate about a rotation axis 61. One drive roller 62 may be driven by a drive arrangement D that may be a motor $M_2$ and suitable gear train 63 to rotate the rotor at a desired speed. Alternatively, the drive arrangement D might be a ratchet drive means as shown in FIGS. 5 and 6. Other drive arrangements might also be used including a ring gear on the outer surface 56 of the rotor 54 driven by a pinion gear also driven by a motor M and suitable gear train 63. Alternatively, a belt or chain drive could be used. Conveniently, at least one ring seal 64 is positioned within the annular space 65 between the rotor 54 and the outer wall 43 to prevent gas flow along the space 65. The ring seal 64 might be positioned at any axial position along the rotor. A further seal 121 may be provided in or on each partition wall 123 engageable with a respective planar end 120 of the desiccant media material to restrict gas flow between the paths 80, 81.

In the embodiment of FIG. 4, the drive arrangement D may be a continuous drive arrangement or a discontinuous drive arrangement for rotating the rotor 54 in a discontinuous motion whereby the rotor 54 is stationary for a predetermined period of time between periods of rotational movement.

Figure 4A:
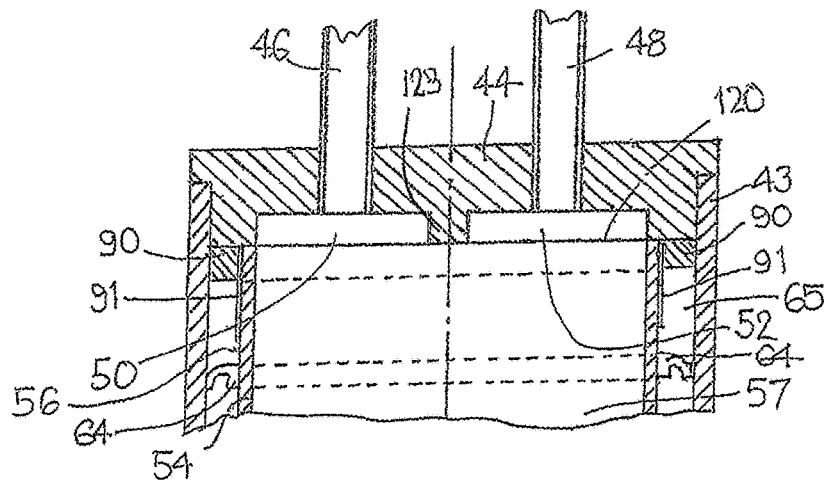
FIGS. 4*a* and 4*b* are partial views similar to FIG. 4 showing possible alternative arrangements.
Figure 4B:
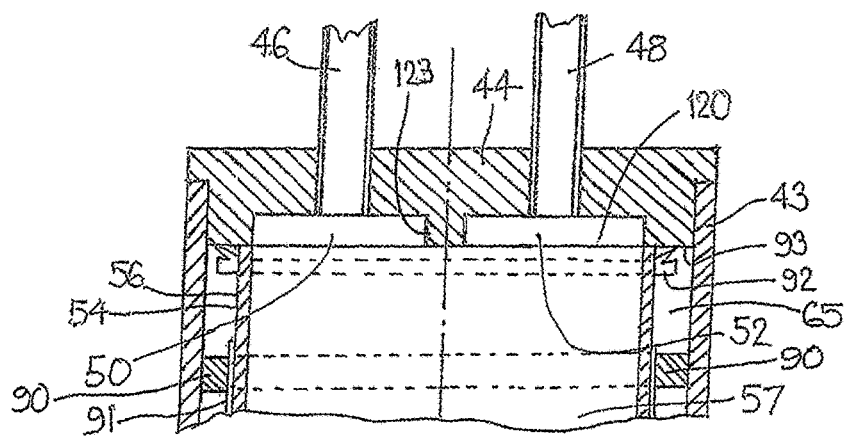

Referring to the above description because the drive arrangement D is cooperable with an outer circumferential region of the rotor 54, there is no centre axle as in the prior art arrangements. FIG. 4a illustrates a possible variation to the idler roller construction shown in FIG. 4. As shown in FIG. 4a, a ring bearing 90 is suitably mounted by means not illustrated in the space 65 surrounding the rotor 54 and slideably engaging a portion of the outer surface 56 of the rotor 54. Conveniently a dry lubricant coating 91 might be provided between the rotor outer surface 54 and the ring bearing 90. The dry lubricant coating 91 might be Teflon or any other similar suitable material. At least one further supporting ring bearing 90 might be provided axially spaced along the rotor. Each ring bearing 90 may be provided cooperable with a dry lubricant coating 91 or alternatively, a dry lubricant coating 91 might cover the whole outer surface 56 of the rotor 54. FIG. 4b illustrates further possible variations where the ring bearing 90 is repositioned axially and a seal 92 is operative between the outer surface 56 of the rotor 54 and the inner surface 93 of the end cap 44. The space 58 within the rotor 54 is filled, in use with a suitable desiccant media 57 which may be any known such desiccant media including, but not limited to any known hygroscopic material including such materials coated onto a substrate including metal sheet material, paper, plastics materials including fibreglass; molecular sieve's, silica gel and salt. In use, a compressed gas passing along the gas flow path 81 defined by pipes 49, 48 that contains moisture, when passing through the desiccant media, will give up moisture to the desiccant media so that the compressed gas is "dried", i.e. is dryer than when it entered the dryer 22. When the rotor 54 has rotated to place the desiccant media that has absorbed moisture from the flow 49, 48, in the flow 46, 47, the compressed gas in this flow is sufficiently dry to regenerate the desiccant media, i.e. remove the absorbed moisture from the desiccant media, before the desiccant media is returned to the flow 49, 48 to repeat the process. While FIGS. 4, 7 show end caps 44, 45 with internal zones divided into two halves, the end caps 44, 45 can instead be divided into multiple sectors (FIG. 8) such that further pairs of passages 70 and recessed chambers 71 can permit the gas to be passed a number of times back and forth between the ends of the rotor 54 to achieve further drying or cooling of the hot sector by the outgoing dry gas.

FIGS. 5 and 6 illustrate a rotary adsorbent desiccant dryer according to another embodiment of the present invention showing a discontinuous drive arrangement for rotating the inner rotor of the dryer. This drive arrangement includes, a ratchet ring 95 provided in or on the outer surface 56 of the rotor 54. As illustrated, the ratchet ring 95 is machined into the outer surface 56 of the rotor 54. The ratchet ring 95 may, of course be formed as a separate ring that is mounted to or secured to the outer surface 56 of the rotor. The ratchet ring 95 is conveniently positioned axially intermediate the ends of the rotor 54 but can be positioned otherwise if desired. A ratchet pawl 97 is provided cooperable with the ratchet teeth 96 of the ring 95, the ratchet pawl 97 being reciprocated along path 98 such that the pawl 97 slips over the ratchet teeth 96 when moving to the right in FIG. 5 and engages the teeth 96 when moving to the left in FIG. 5 to rotate the rotor 54 in an anti-clockwise direction (FIG. 5). An actuator 99, typically a pneumatic actuator, is provided to selectably move the ratchet pawl 97 along path 98. An electrical timer 100 controlling a solenoid 101 which in turn controls the actuator 99, is also provided to enable the speed of rotation of the rotor 54 to be selectably varied, as desired. An air supply 102 is provided to the actuator 99 to enable it to reciprocate the pawl 97. It will of course be recognized by those skilled in the art that other physical constructions of the ratchet drive arrangement and actuator are also possible. FIG. 6 illustrates schematically parts of the dryer 22 in perspective view with the drive mechanism 103 for the pawl 97 mounted to an outer surface of the outer wall 43. The pawl 97 extends through an opening 104 in the outer wall 43 and is sealed in a ratchet pawl housing part 105 that is shown open for the sake of clarity in FIG. 6. FIG. 6 also shows bores 106 formed in bore projections 117 on the outer wall 43 of the dryer 22 for receiving connecting rods (not illustrated) to allow the end caps 44, 45 to be mounted to the outer wall 43.

Figure 9:
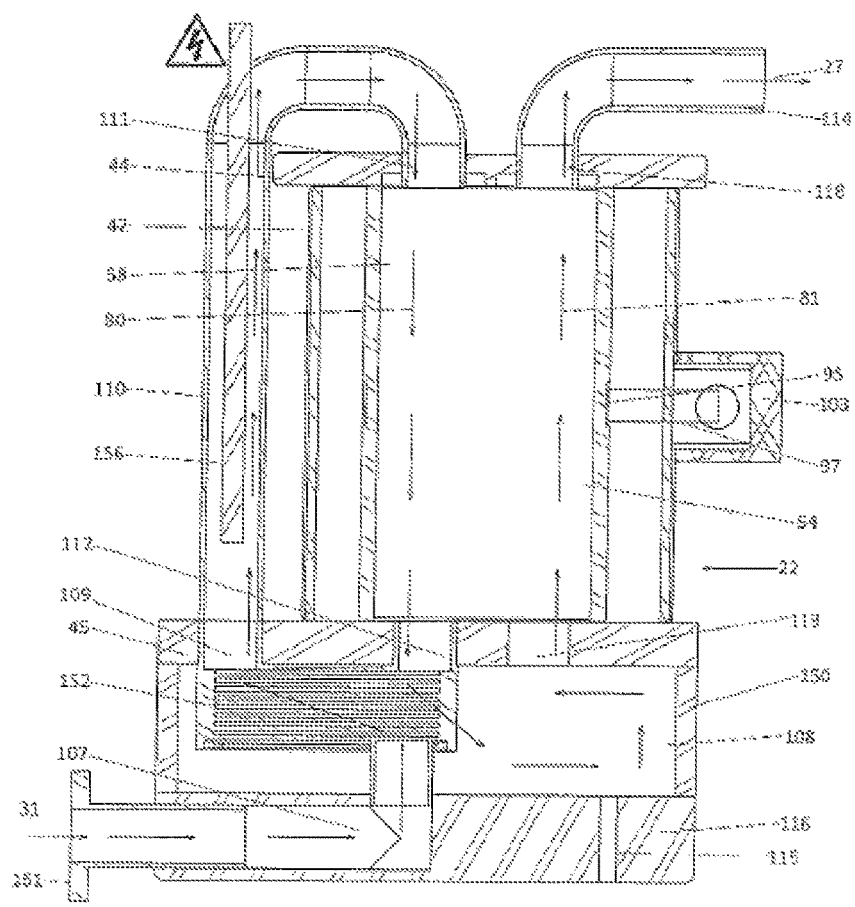
FIG. 9 illustrates schematically a rotary adsorbent dryer according to another embodiment of the present invention.

FIG. 9 illustrates schematically one further possible arrangement for a rotary adsorbent desiccant dryer 22 according to another embodiment of the present invention where like features in earlier described embodiments have been given the same reference numbers. In this embodiment, an enclosed chamber 108 is located adjacent to and outwardly of one of the spaced end walls formed by the lower end cap 45. The chamber 108 is enclosed by the end cap 45, a further annular wall 150 connected to an extending between the end cap 45 and a further lower wall member 116 extending parallel to and spaced from the end cap 45. A heat exchanger 152 is positioned in the chamber 108 adjacent an opening passage in the end cap 45 leading from the internal zone 58 of the rotor 54 in which the desiccant media material is located. The lower wall member 116 has an inlet 151 for compressed gas from a compressor and a gas passage 107 leading to the heat exchanger 152. In operation, cool moist compressed gas enters the dryer 22 at inlet 151 and passes along passage 107 to the heat exchanger 263 located in the enclosed chamber 108. The compressed gas flow from passage 107 passes through the heat exchanger 152 and into a passage 109 in the end cap 45, and from there, into a pipe 110 mounted externally of the outer housing 42 of the rotary dryer. The heater 156 may, as shown, be mounted physically in the pipe 110, the heater 156 being connected to a source of energy such as an electrical supply to provide the heat energy to the gas flowing in the pipe 110. The pipe 110 leads to an opening 111 through the top end cap 44 such that the gas flow passes along gas flow path 80 through the desiccant media in the inner rotor 54 to the opening passage 112 in the lower end cap 45. The passage 112 leads the gas flow directly through the heat exchanger 152 and into part of the lower chamber 108 outside the heat exchanger. The gas flow then leaves the lower chamber 108 through an opening 113 in the lower end cap 45 to pass along gas flow path 81 through the desiccant media in the inner rotor 54 and through an opening 118 in the upper end cap 44 to an exit pipe 114 leading to the cool dry compressed gas output 27. A liquid moisture drain 115 may be provided from the chamber 108. The moisture drain 115 may be formed in the lower wall member 116 in which the passage 107 is formed.

As shown schematically in FIG. 9, the inner rotor 54 is rotated by a ratchet pawl 97 engaging a ratchet ring 95 on an outer surface of the rotor 54 with a reciprocating drive mechanism 103 provided for reciprocating the ratchet pawl 97 similar to FIGS. 5 and 6. It will, however, be appreciated that the arrangement of the heat exchanger 152 within an enclosed chamber 108 in a common housing assembly of the rotary dryer of FIG. 9 may also be used with other types of continuous or discontinuous drive arrangements for rotating the rotor 54.

A relatively major source of performance degradation in rotary dryers is the leakage of moisture laden air across the sealing face to the dry side of the desiccant containing rotor. Providing a seal to prevent such leakage is therefore important in maintaining performance, however, the design of such seals has conflicting requirements. These include low friction and good wear lives, however, against this is the need to provide an effective seal performance. Further, the relative seal area is greater in small drum or rotor dryers than larger drum dryers such that possible leakage has greater relative effect in small dryers of this type. There is also a need to attain very low dew points as even a very small leak can have very deleterious consequences for performance.

A particular aspect of a discontinuous rotation of the drum or rotor, such that may be obtained with a ratchet indexing mechanism, as previously described, is that the desiccant containing rotor moves discontinuously. With this movement regime, it is possible for the rotor to rotate for less than 2 to 5% of the time of the total operational time of the dryer, i.e. the rotor may move during indexing for about 0.2 to 1 second and is stationary for the remainder of the time, until an indexing movement is required again.

Figure 10A:
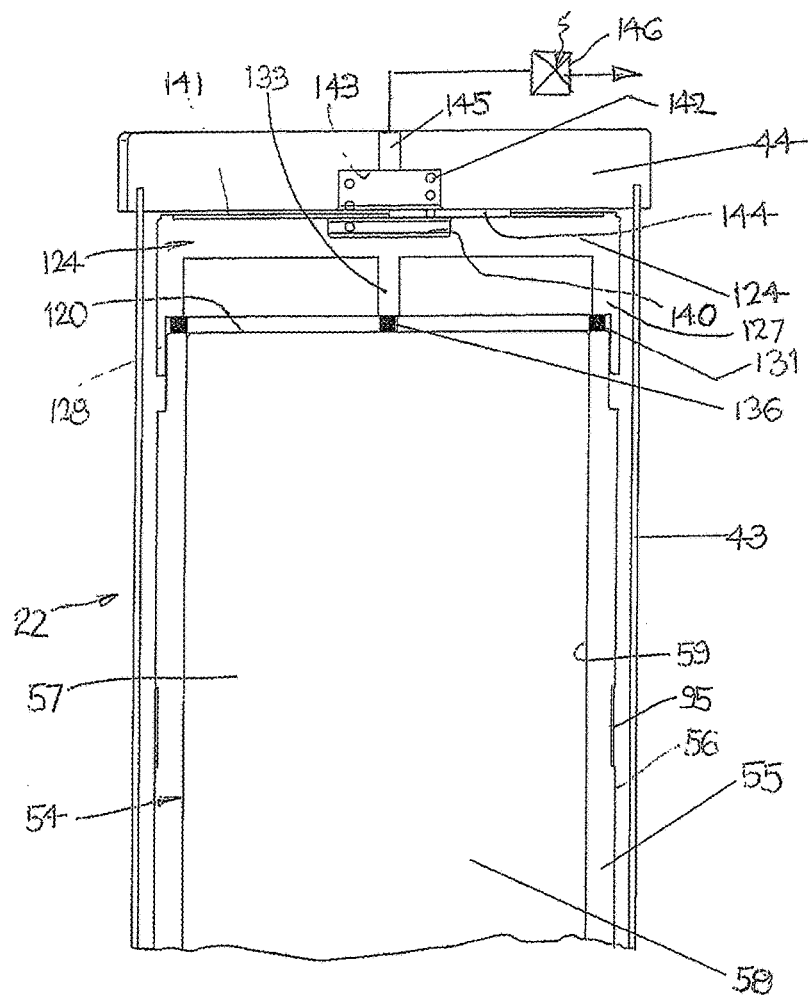
FIG. 10*a* illustrates a partial diametral cross-sectional view of a still further embodiment of a rotary adsorbent dryer.

FIGS. 10a, 10b and 11 illustrate a novel and effective sealing arrangement. These drawings illustrate a modified form of a rotary adsorbent dryer 22 where like features in previously described embodiments have been given the same reference numbers. FIGS. 10a, 10b and 11 illustrate a floating head member in the form of a floating clamp plate 124 positioned between the end cap 44 and the end region 125 of the rotor 54. The floating clamp plate 124 has a web part 126 with a peripheral skirt 127 cooperable with the end region 125 of the rotor 54. Conveniently a first end part 128 of the skirt 127 slides on an outwardly facing cylindrical surface 129 of the end region 125. A stepped region 130 in the skirt 127 presses, in use, a seal member 131 against an end edge surface 132 of the rotor 54. In the embodiment illustrated, a diametral wall 133 extends across the clamp plate 124 joining opposite sides of the skirt 127 forming two internal zones 134, 135 within the skirt 127. It will of course be appreciated that other arrangements with three or more internal zones such as shown in FIG. 8 for example, may be provided. A part 136 of the seal member 131 may be provided pressed between the internal wall 133 and the end surface 120 of the desiccant media material 57. In the illustrated embodiment, a pair of diametrically opposed first gas flow passages 137, only one of which is shown in FIG. 10b are provided through the stationary end cap 44, each being respectively cooperable with a second gas flow passage 138 leading through the web part 126 of the clamp plate 124 with a sliding seal 139 operable therebetween. The web part 126 further includes a first location recess 140 on an outer facing surface 141 to locate one end of an urging spring 142. A second location recess 143 is provided in the inner surface 144 of the end cap 44 to locate the other end of the urging spring 142 such that the spring 142 urges the clamp plate 124 towards the rotor 54. A vent passage 145 is provided to enable pressure from the outer face of the clamp plate 124 to be vented, when desired, and preferably when the rotor 54 is rotating to relieve pressure on the seal member 131. Venting of this space via passage 145 may be achieved by use of a solenoid valve 146.

In the above described arrangement, a two step sealing action is realised. The seal members 131 are constructed as end seals with a large surface area to provide excellent sealing. The clamp plate 124 increases the sealing effect during the time the rotor 54 is stationary but sealing friction forces are substantially reduced by relaxing the clamp plate 124 when the rotor is rotationally moved. As a result little friction based wear of the seal members 131 occurs. Even though gas leakage may increase slightly during rotational movement of the rotor 54, this period is, in percentage terms, so low that any such losses have minimal effect and a high performance level is maintained.

The clamp plate 124 described above and illustrated in FIGS. 10a, 10b and 11 may be applied to only one end of the rotor 54 or more preferably to both ends of the rotor 54. After the rotational movement of the rotor 54 is ended, the vent solenoid 146 is deenergized and compressed air is readmitted to the centre section with the spring 142 biasing the clamp plate member 124 and the seal 131 against the new stationary rotor 54 until the next indexing rotational movement. While the above describes one method of activating the clamp plate member 124, other methods could also be used including pressurising an activating piston, an electromagnetic clamping arrangement or an inflatable seal.

Figure 12A:
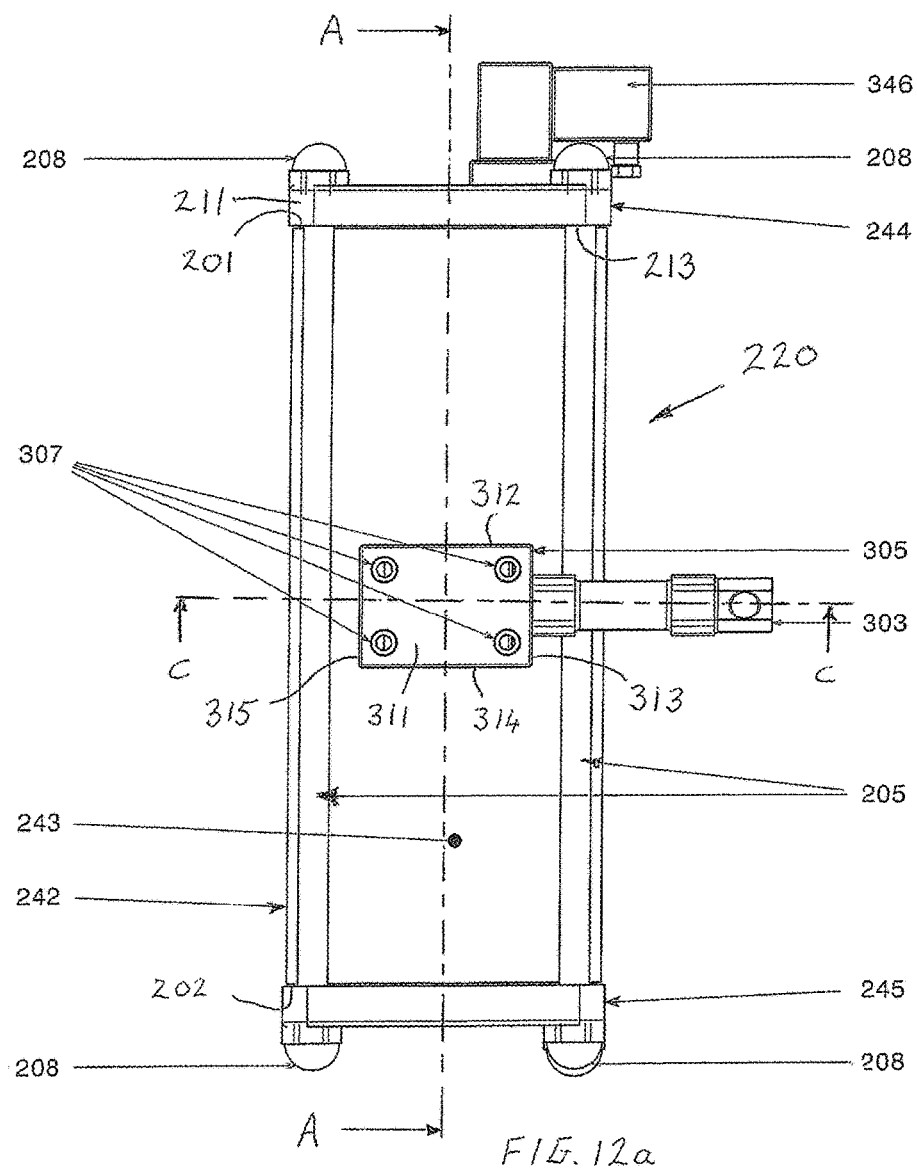
FIG. 12*a* is an external side view of another embodiment of a rotary adsorbent dryer of the invention.
Figure 12B:
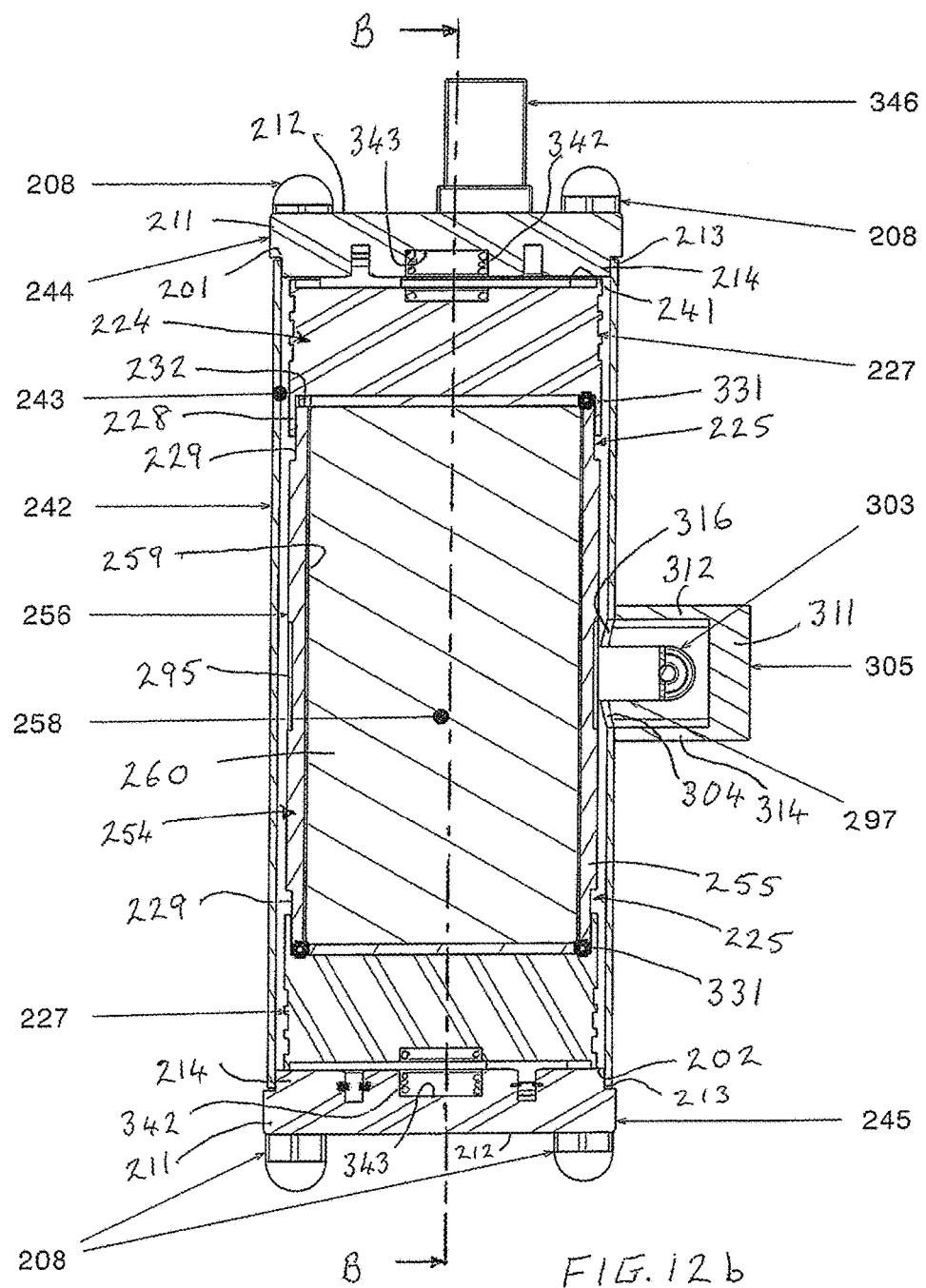
FIG. 12*b* is a section on the line A-A of FIG. 12 *a;*
Figure 12C:
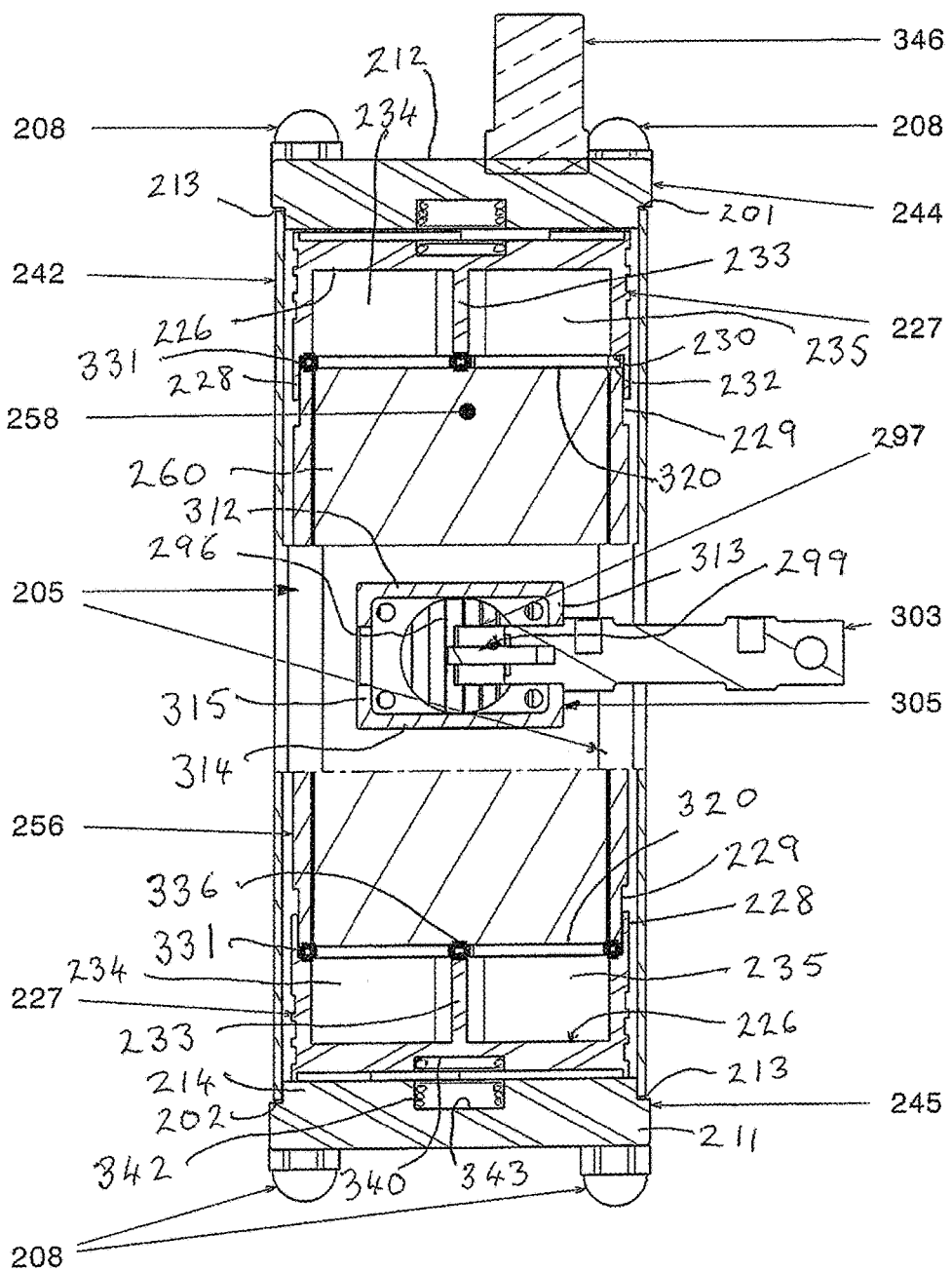
FIG. 12*c* is a section on the line B-B of FIG. 12*b* including a mid section through the ratchet block housing on the line C-C of FIG. 12*a;*

FIGS. 12a, 12b and 12c show views of a further embodiment of a rotary dryer assembly 220 which is similar to the embodiments of FIGS. 5, 6, 10a, 10b and 11, and FIGS. 13 to 30 show components of the rotary dryer assembly of FIGS. 12a, 12b and 12c. The rotary dryer assembly 220 of FIG. 12 comprises a stationary outer casing 242 having an annular outer wall 243 (also shown in FIG. 13) and stationary end walls provided by opposed end caps 244, 245 (shown in FIGS. 21-26). Each end cap 244,245 is fixed and sealed to a respective end 201, 202 of the annular outer wall 243. As shown in FIGS. 21 to 26, each end cap 244, 245 has a substantially square plate portion 211 with an external surface 212 and an internal surface 213, and a circular portion 214 extending from the internal surface 213. In the rotary dryer assembly 220 shown in FIG. 12a, four fixing rods 205 are provided which have threaded end portions which extend through respective apertures 206 in the corners of the square plate portions 211 of the end caps 244, 245. A plurality of fixing nuts 208 engage with the threaded end portions of the fixing rods 206 to fix the annular outer wall 243 between the square plate portions 211 of the end caps 244,245 and around the respective circular portions 214.

As shown in FIGS. 12 and 13, the annular outer wall 243 has a circular opening 304 in its peripheral surface 301. The circular opening 304 is surrounded by four fixing apertures 302 and a ratchet pawl housing 305 (also shown in FIGS. 14-16) is attached over the circular opening 304. The ratchet pawl housing 305 is of generally hollow rectangular form having a substantially rectangular closed end wall 311, four side walls 312,313, 314,315, and an open end 316 opposite the closed end wall 311. At the open end 316, the end surfaces 317 of two opposed side walls 312, 314 and the end edges 319 of the other two opposed side walls 312, 314 are curved so as to fit snugly against the peripheral outer cylindrical surface 301 of the annular outer wall 243. The ratchet pawl housing 305 can be secured to the annular outer wall 243 by fixing bolts 307 or the like which extend through apertures 308 in the closed end wall 311 of the housing 305 and through the fixing apertures 302.

In use, the ratchet pawl housing 305 contains a ratchet pawl 297 similar to the ratchet pawl 97 of FIGS. 5 and 6, and at least one of the other opposed side walls 313,315 has an opening 318 through which housing 303 of a reciprocating drive mechanism for reciprocating the ratchet pawl 297 extends. The drive mechanism includes a reciprocating drive member 296 connected to the ratchet pawl 297.

FIGS. 12b, 12c and 17 to 20 show a rotor 254 of the rotary dryer which is in the form of a cylindrical drum having an annular wall 255 with an outer peripheral surface 256 and a cylindrical inner surface 259. The inner surface 259 of the annular wall 255 defines an internal zone 258 within the rotor drum 254 for containing desiccant media material 260.

A ratchet ring 295 having a ratchet teeth 296 is machined into the outer surface 256 of the rotor 254. As shown in FIGS. 17 to 19, the ratchet ring 295 is conveniently positioned axially intermediate the ends of the rotor 254 but can be positioned otherwise if desired. The ratchet ring 295 is adapted to co-operate with the reciprocating ratchet pawl 297 similar to the ratchet pawl 97 of FIGS. 5 and 6. The ratchet pawl is engageable with the ratchet teeth 296 of the ring 295 to rotate the rotor 254 in a discontinuous manner in similar manner to that described with reference to FIGS. 5 and 6.

As shown in FIGS. 17 to 19, the rotor 254 has end regions 225 which have external annular surfaces 229 with end edge surfaces 232 that are adapted to engage with ring seal members 331 of a sealing arrangement. The ring seal members are similar to the seal members 131 shown in FIGS. 10a and 10b. The annular surfaces 229 of the end regions 225 are of reduced diameter to accommodate one or more floating head members 224 (see FIGS. 27 to 31) of the sealing arrangement.

As shown in FIGS. 21 to 26, each end cap 244,245 has a pair of diametrically opposed gas flow passages 237 extending through the plate portion 211 and the circular portion 214. The gas flow passages 237 each have an internal screw thread 347 which may receiving the threaded end of a respective compressed gas pipe (not shown) connected to the dryer 220. A central location recess 343 is provided in the internal surface 215 of the circular portion 214 of the end cap 244,245. The location recess 343 is adapted to receive one end of an urging spring 342 in similar manner to the second location recess 143 in the end cap 44 of FIG. 10a.

At least one of the end caps 244 is also provided with a small through bore 345 which acts as a vent passage in similar manner to the vent passage 145 of FIG. 10a. Opening and closing of the vent passage 345 is controlled by a solenoid valve 346 which may be mounted to the external surface of the end cap 244, 245 by fixing means such as fixing screws extending through fixing holes 349 in external surface of the respective plate portion 211 of the end cap 244 surrounding the through bore 345 in the end cap 244.

FIGS. 12c, and 27 to 31 show the floating head member 224 of the sealing arrangement in more detail. The floating head member 224 is similar to the floating clamp plate of FIGS. 10a, 10b and 11 in that it has a planar web part 226 and an annular peripheral skirt 227. The end part 228 of the peripheral skirt 227 is of reduced thickness to provide a stepped region 230 adapted to receive an annular part of the seal member 331. In use, the annular part of the seal member 331 is trapped between the stepped region 230 of the floating head member 224 and a respective end edge surface 232 of the rotor 254, and the end part 228 of the peripheral skirt 227 is slidable on the outer cylindrical surface 229 of the end region 225 of the rotor 254 to apply greater or lesser sealing pressure to the seal member 331.

The floating head member 224 has a diametral partition wall 233 provided on the internal surface of the web part 226 which divides the internal region within the skirt 227 into two internal zones 234, 235. The seal member 331 also includes at least one radially extending part 336 which engages the end of the partition wall 233 to seal against the end surface 320 of the desiccant media material 260.

The web part 226 of the floating head member 224 has a pair of diametrically opposed openings 238 on each side of the partition wall 233 and a pair of connecting tubes 239 are provided on the outer facing surface 241 of the web part 226 around the openings 238. The openings 238 and connecting tubes 239 provide second gas flow passages 237 in the end caps 244, 245. The external surfaces of the connecting tubes 239 may be provided with sliding seals 357 engageable with the internal surfaces of the gas flow passages 237 in the end caps 244, 245.

The outer facing surface 241 of the web part 226 is also provided with a first location recess 340 adapted to receive the other end of the urging spring 342.

In use, the various components, including parts 243, 244, 245, 254, 305 and 345 of the rotary adsorbent dryer 220 of FIGS. 12 to 31 are assembled together with appropriate seals and a drive arrangement for reciprocating a ratchet pawl within the ratchet pawl housing 305. The ratchet pawl 297 engages with the ratchet teeth 256 of the ratchet ring 255 to rotate the rotor 254 in a discontinuous motion in which the rotor is stationary for a predetermined period of time between periods of rotational movement in similar manner to the embodiment of FIGS. 5 and 6. When the rotor 254 is stationary, the floating head member 224 and the urging spring 342 received in the first and second location recesses 340 and 343 urges the seal member 331 into sealing engagement with a respective end surface 232 of the rotor 254. This sealing engagement is relaxed during periods of rotational movement of the rotor 254 by actuating the solenoid valve 346 to vent air from adjacent the outer surface 241 of the web part 226 of the floating head member 224 through the vent passage 345 so that the floating head member 224 slides in a direction away from the respective end surface 232 of the rotor 254.

It will be appreciated that the drive mechanism for producing the discontinuous rotation of the rotor 254 should be synchronised with the sliding movement of the floating head member 224. For this purpose, a control arrangement including a timer (not shown) similar to the timer 100 of FIG. 5 may be provided which not only controls the reciprocating movement of the ratchet pawl, but also controls actuation of the solenoid valve 346.

Further modification of the above described embodiments within the scope of the annexed patent claims will be apparent to those skilled in the art.

That which is claimed is:

1. A rotary adsorbent dryer including a stationary outer housing having spaced stationary end walls, a rotor rotatably mounted within said outer housing for rotation about a rotation axis, the rotor having substantially open opposed ends, each of which is positioned adjacent to a respective one of the end walls of the outer housing, a plurality of first compressed gas flow passages passing through the end walls providing, in use, compressed gas flow to or from a respective substantially open end of the rotor, and a drive arrangement for rotating the rotor about the rotation axis, the drive arrangement being cooperable with an outer circumferential region of the rotor, wherein the drive arrangement provides discontinuous movement of the rotor whereby the rotor is stationary for a predetermine period of time between periods of discontinuous rotational movement.

2. A rotary adsorbent dryer according to claim 1 wherein the rotor is a rotary drum which includes a desiccant media and a drive shaft is excluded from extending axially through the rotary drum.

3. A rotary adsorbent dryer according to claim 1 wherein the rotor includes a continuous annular wall extending axially between said open ends and the stationary outer housing includes a continuous outer annular wall of greater diameter than the annular wall of the rotor whereby an annular space is formed therebetween.

4. A rotary adsorbent dryer according to claim 3, wherein a seal arrangement is provided which is operable to prevent gas flow axially along the annular space.

5. A rotary adsorbent dryer according to claim 1, further including at least one seal member operably engaging at least one end region of the rotor, and an urging arrangement for providing an urging force to urge the least one seal member into operable sealing engagement with the at least one end region of the rotor while the rotor is stationary.

6. A rotary adsorbent dryer according to claim 1, wherein said predetermined period of time that the rotor is stationary is selectably variable.

7. A rotary adsorbent dryer according to claim 1, wherein said drive arrangement includes a ratchet ring having a plurality of ratchet teeth connected to, or integrally formed in, an outer peripheral surface of the rotor, and at least one movable ratchet pawl engageable with the ratchet teeth of the ratchet ring to cause said rotor to rotate.

8. A rotary adsorbent dryer according to claim 7, wherein the drive arrangement includes a control to actuate the at least one ratchet pawl selectably to vary rotational speed of the rotor.

9. A rotary adsorbent dryer according to claim 3, further including at least one bearing ring surrounding and supporting an outer circumferential surface zone of the rotor.

10. A rotary adsorbent dryer according to claim 9, wherein at least the or each outer surface zone of the rotor carries a dry lubricant surface coating cooperable with the or each said bearing ring.

11. A rotary adsorbent dryer according to claim 3, wherein the rotor is supported for rotation by idler rollers engaging the cylindrical outer wall surface of the rotor.

12. A rotary adsorbent dryer including spaced first and second stationary end walls, a rotor rotatably mounted between the spaced first and second stationary end walls for rotation therebetween, the rotor having substantially open opposed ends, a plurality of first compressed gas flow passages passing through said first and said second stationary wall means providing, in use, compressed gas flow to or from a respective substantially open end of the rotor, a drive arrangement for rotating the rotor about a rotation axis in a discontinuous motion whereby the rotor is stationary for a predetermined period of time between periods of rotational movement, the rotary adsorbent dryer further including a seal arrangement including at least one seal member operably engaging at least one end region of said rotor, and an urging arrangement for providing an urging force to urge the at least one seal member into operable sealing engagement with the at least one end region of the rotor while the rotor is stationary.

13. A rotary adsorbent dryer according to claim 12, wherein the urging force is relaxed when the rotor is rotationally moved.

14. A rotary adsorbent dryer according to claim 12 wherein the at least one seal member engages at least a peripheral end surface of said rotor.

15. A rotary adsorbent dryer according to claim 14, wherein the seal arrangement includes a sealing portion engageable with an end surface of a desiccant media material positioned within the rotor.

16. A rotary adsorbent dryer according to claim 15, wherein the sealing portion includes at least two radial legs meeting at a centre location.

17. A rotary adsorbent dryer according to claim 12, wherein the urging arrangement includes at least one floating head member cooperable with the seal member located at at least one end of the rotor, the at least one floating head member being partially axially movable only when the rotor is stationary.

18. A rotary adsorbent dryer according to claim 17, wherein the floating member is mounted to be non-rotational about the rotation axis of the rotor, the floating head member further including a plurality of second gas flow passages, each cooperable with a respective first gas flow passage passing through a respective stationary end wall, and a sliding seal operable between each pair of cooperating first and said second gas flow passages.

19. A rotary adsorbent dryer according to claim 1 including:
an enclosed chamber located outwardly of an adjacent one of the spaced end walls; and
a heat exchanger arrangement positioned in the enclosed chamber whereby the compressed gas flow to the rotary adsorbent dryer passes through the heat exchanger arrangement through a further flow passage formed in a first end wall of the spaced end walls and through a first pipe leading to a gas flow passage in a second wall of the spaced end walls, the second end wall being spaced from the first end wall.

20. A rotary adsorbent dryer comprising:
a stationary outer housing having spaced stationary end walls, a rotor rotatably mounted within said outer housing for rotation about a rotation axis, the rotor having substantially open opposed ends, each of which is positioned adjacent to a respective one of the end walls of the outer housing, a plurality of first compressed gas flow passages passing through the end walls providing, in use, compressed gas flow to or from a respective substantially open end of the rotor, and a drive arrangement for rotating the rotor about the rotation axis, the rotary adsorbent dryer further including:
an enclosed chamber located outwardly of an adjacent one of the spaced end walls; and
a heat exchanger arrangement positioned in the enclosed chamber whereby the compressed gas flow to the rotary adsorbent dryer passes through the heat exchanger arrangement through a further flow passage formed in a first end wall of the spaced end walls and through a first pipe leading to a gas flow passage in a second wall of the spaced end walls, the second end wall being spaced from the first end wall.

21. A rotary adsorbent dryer according to claim 20, wherein a heater is located in the first pipe whereby heat can be applied to gas flow in the first pipe.

22. A rotary adsorbent dryer according to claim 1, wherein the rotary adsorbent dryer has at least two compressed gas flow paths therethrough, a first one of the compressed gas flow paths being arranged to regenerate desiccant media in the rotary adsorbent dryer by absorbing moisture from the desiccant media into the compressed gas flow along the first gas flow path, and a second one of the compressed gas flow paths being arranged to give up moisture in compressed gas flowing along the second gas flow path to the desiccant media whereby the compressed gas flowing along the second path is discharged from the rotary adsorbent dryer, dryer than when it entered the rotary adsorbent dryer.

23. A compressed gas dryer incorporating a rotary adsorbent dryer according to claim 22, wherein the compressed gas dryer includes: first cooling means to cool compressed gas discharged from the gas compressor; first moisture separation means to receive cooled compressed gas flow from said first cooling means to trap and discharge a first condensed moisture flow therefrom; and heating means to heat compressed gas flowing into said rotary adsorbent dryer along said first path.

* * * * *